US012811186B2

(12) United States Patent
Iwane et al.

(10) Patent No.: US 12,811,186 B2
(45) Date of Patent: Nov. 24, 2026

(54) SOLID-STATE BATTERY

(71) Applicant: Murata Manufacturing Co., Ltd., Nagaokakyo (JP)

(72) Inventors: Nobuyuki Iwane, Nagaokakyo (JP); Koichi Nakano, Nagaokakyo (JP); Yusuke Funada, Nagaokakyo (JP); Katsunori Takahara, Nagaokakyo (JP); Kiyoshi Kumagae, Nagaokayo (JP); Keisuke Shimizu, Nagaokayo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 715 days.

(21) Appl. No.: 17/842,147

(22) Filed: Jun. 16, 2022

(65) Prior Publication Data

US 2022/0328868 A1 Oct. 13, 2022

Related U.S. Application Data

(63) Continuation of application No. PCT/JP2020/043663, filed on Nov. 24, 2020.

(30) Foreign Application Priority Data

Dec. 19, 2019 (JP) ................................ 2019-229667

(51) Int. Cl.
*H01M 10/0562* (2010.01)
*H01M 4/02* (2006.01)
(Continued)

(52) U.S. Cl.
CPC ....... *H01M 10/0562* (2013.01); *H01M 4/133* (2013.01); *H01M 4/366* (2013.01);
(Continued)

(58) Field of Classification Search
CPC ......... H01M 10/0562; H01M 10/0525; H01M 10/0585; H01M 50/543; H01M 4/133; H01M 4/366; H01M 4/621
See application file for complete search history.

(56) References Cited

U.S. PATENT DOCUMENTS

| | | | | |
|---|---|---|---|---|
| 8,338,036 | B2 | 12/2012 | Doi | |
| 2011/0281160 | A1* | 11/2011 | Doi | H01M 10/0562 429/211 |
| 2013/0149592 | A1* | 6/2013 | Hayashi | H01M 50/512 429/160 |
| 2019/0260070 | A1* | 8/2019 | Kishimoto | H01M 4/133 |
| 2019/0273237 | A1* | 9/2019 | Kawai | H01M 4/13 |
| 2019/0393505 | A1 | 12/2019 | Suzuki et al. | |

(Continued)

FOREIGN PATENT DOCUMENTS

| | | | |
|---|---|---|---|
| CN | 101861675 | A | 10/2010 |
| CN | 110521047 | A | 11/2019 |

(Continued)

OTHER PUBLICATIONS

WO-2018092434-A1 English machine translation (Year: 2025).*
International Search Report in PCT/JP2020/043663, mailed Jan. 19, 2021, 3 pages.

*Primary Examiner* — Armindo Carvalho, Jr.
(74) *Attorney, Agent, or Firm* — ArentFox Schiff LLP

(57) ABSTRACT

A solid-state battery that includes: a solid-state battery laminate including at least one battery constituent unit including: a positive electrode layer, the positive electrode layer containing a conductive carbon material; a positive electrode current collecting portion arranged at an end surface of the positive electrode layer; a negative electrode layer; and a solid-state electrolyte layer interposed between the positive electrode layer and the negative electrode layer in a stacking direction thereof; a positive electrode terminal electrically connected to the positive electrode current collecting portion; and a negative electrode terminal electrically connected to the negative electrode layer.

18 Claims, 7 Drawing Sheets

(51) Int. Cl.

| | |
|---|---|
| ***H01M 4/133*** | (2010.01) |
| ***H01M 4/36*** | (2006.01) |
| ***H01M 4/62*** | (2006.01) |
| ***H01M 10/0525*** | (2010.01) |
| ***H01M 10/0585*** | (2010.01) |
| ***H01M 50/543*** | (2021.01) |

(52) U.S. Cl.

CPC ....... *H01M 4/621* (2013.01); *H01M 10/0525* (2013.01); *H01M 50/543* (2021.01); *H01M 2004/027* (2013.01); *H01M 2004/028* (2013.01); *H01M 10/0585* (2013.01); *H01M 2300/0065* (2013.01)

(56) References Cited

U.S. PATENT DOCUMENTS

| | | | | |
|---|---|---|---|---|
| 2020/0350613 | A1 | 11/2020 | Kato et al. | |
| 2020/0358133 | A1 | 11/2020 | Baba et al. | |
| 2021/0083269 | A1* | 3/2021 | Kusama | H01M 10/054 |

FOREIGN PATENT DOCUMENTS

| | | | | | |
|---|---|---|---|---|---|
| JP | 2018170189 | A | | 11/2018 | |
| WO | 2010089855 | A1 | | 8/2010 | |
| WO | WO-2018092434 | A1 | * | 5/2018 | H01B 1/06 |
| WO | WO-2018092484 | A1 | * | 5/2018 | C03C 10/00 |
| WO | WO-2018138976 | A1 | * | 8/2018 | H01M 10/0585 |
| WO | 2018235398 | A1 | | 12/2018 | |
| WO | 2019164006 | A1 | | 8/2019 | |
| WO | 2019/176940 | A1 | | 9/2019 | |
| WO | 2019167856 | A1 | | 9/2019 | |

* cited by examiner

FIG. 6 - PRIOR ART

SOLID-STATE BATTERY

CROSS REFERENCE TO RELATED APPLICATIONS

The present application is a continuation of International application No. PCT/JP2020/043663, filed Nov. 24, 2020, which claims priority to Japanese Patent Application No. 2019-229667, filed Dec. 19, 2019, the entire contents of each of which are incorporated herein by reference.

FIELD OF THE INVENTION

The present invention relates to a solid-state battery. More specifically, the present invention relates to a layered solid-state battery formed by stacking layers constituting a battery constituent unit.

BACKGROUND OF THE INVENTION

In the related art, secondary batteries that can be repeatedly charged and discharged have been used for various purposes. For example, the secondary battery has been used as a power source of an electronic device such as a smartphone and a notebook computer.

In the secondary battery, a liquid electrolyte has been generally used as a medium for ion transfer that contributes to charging and discharging. That is, a so-called electrolytic solution is used for the secondary battery. However, in such a secondary battery, safety is generally required in terms of preventing leakage of the electrolytic solution. In addition, an organic solvent or the like used for the electrolytic solution is a flammable substance, and thus the safety is also required.

Therefore, a solid-state battery using a solid electrolyte instead of the electrolytic solution has been studied. For example, Patent Document 1 discloses, as illustrated in FIG. 6, a solid-state battery 250 including a positive electrode current collecting layer 201, a positive electrode active material layer 202, a solid-state electrolyte layer 203, a negative electrode active material layer 204, and a negative electrode current collecting layer 205, in which a carbon material and glass are contained in at least one layer of the positive electrode current collecting layer, the positive electrode active material layer, the negative electrode active material layer, and the negative electrode current collecting layer. In such a solid-state battery 250, for example, since the positive electrode active material layer 202 is stacked on the positive electrode current collecting layer 201, currents are collected on a main surface 2020 of the positive electrode active material layer 202.

Patent Document 1: Japanese Patent Application Laid-Open No. 2018-170189

SUMMARY OF THE INVENTION

The inventors of the present invention have found a new problem that when a structure in which an electrode layer is stacked on an electrode current collecting layer is adopted, the yield and quality are deteriorated and/or the manufacturing cost is increased due to an increase in the number of stacking times. In order to improve the yield and quality and to reduce the manufacturing cost, it is preferable to reduce the number of stacking times as much as possible. If the electrode current collecting layer can be eliminated, the number of stacking times can be reduced, and the effect of improving the yield and quality and the effect of reducing the manufacturing cost can be expected.

Therefore, in a case of adopting a structure in which the electrode current collecting layer is eliminated and an end portion of the positive electrode layer is extended to the positive electrode terminal, a positive electrode layer portion having no negative electrode layer is generated at a facing portion, and the currents are concentrated at the end portion of the negative electrode layer, which causes a problem that lithium dendrite precipitates and a short circuit frequently occurs. In order to solve this problem while taking advantage of reducing the number of stacking times, a structure may be adopted in which a positive electrode current collecting portion is disposed adjacent to the positive electrode layer, and the positive electrode layer and the positive electrode terminal are electrically connected with the positive electrode current collecting portion interposed therebetween. However, in such a case, the inventors of the present invention have found a new problem that the electron conductivity of the positive electrode layer decreases and the theoretical capacity ratio calculated from the active material content is decreased. That is, there is a problem that the capacity that can be actually taken out is significantly lower than the theoretical capacity calculated from the active material content.

An object of the present invention is to provide a solid-state battery which sufficiently prevents a decrease in a theoretical capacity ratio calculated from the active material content and occurrence of a short circuit due to current concentration at an end portion of the negative electrode layer even when the solid-state battery does not include the positive electrode current collecting layer, and sufficiently prevents a decrease in capacity characteristics and load characteristics as compared with a case where a conductive material is not contained.

The present invention relates to: a solid-state battery that includes: a solid-state battery laminate including at least one battery constituent unit including: a positive electrode layer, the positive electrode layer containing a conductive carbon material; a positive electrode current collecting portion arranged at an end surface of the positive electrode layer; a negative electrode layer; and a solid-state electrolyte layer interposed between the positive electrode layer and the negative electrode layer in a stacking direction thereof; a positive electrode terminal electrically connected to the positive electrode current collecting portion; and a negative electrode terminal electrically connected to the negative electrode layer.

Since the solid-state battery according to the present invention does not have a positive electrode current collecting layer, and the number of stacking times in a manufacturing process of the solid-state battery is reduced, improvement in yield and quality and reduction in the manufacturing cost are achieved.

The solid-state battery according to the present invention has a structure in which the positive electrode layer and the positive electrode terminal are electrically connected with the positive electrode current collecting portion interposed therebetween, and formation of a portion having no negative electrode layer at an opposing portion in the positive electrode layer is more sufficiently prevented, so that occurrence of a short circuit due to current concentration at an end portion of the negative electrode layer is more sufficiently prevented.

The solid-state battery according to the present invention more sufficiently prevents a decrease in a theoretical capacity ratio calculated from the active material content, and more sufficiently prevents a decrease in the capacity characteristics and the load characteristics as compared with a case where no conductive material is contained.

BRIEF EXPLANATION OF THE DRAWINGS

FIG. 6 is a sectional view schematically illustrating a solid-state battery relating to the related art.

DETAILED DESCRIPTION OF THE INVENTION

[Solid-State Battery]

Figure 1:
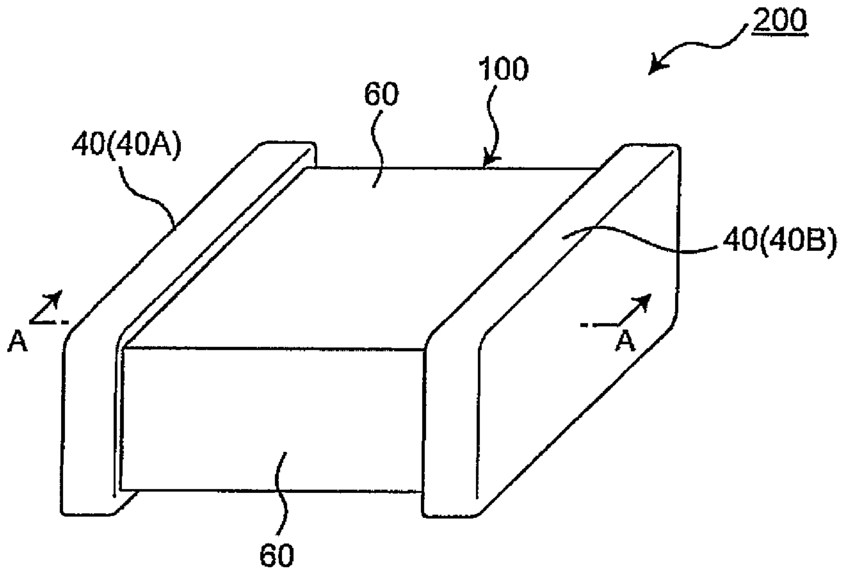
FIG. 1 is an external perspective view schematically illustrating a solid-state battery according to an embodiment of the present invention.

Hereinafter, "solid-state battery" according to certain aspects of the present invention will be described in detail. Although the description will be made with reference to the drawings as necessary, the illustrated contents are only schematically and exemplarily illustrated for the understanding of the present invention, and appearances, dimensional ratios, and the like may be different from actual ones.

The term "solid-state battery" used in the present description refers to a battery whose constituent elements are formed of a solid in a broad sense, and refers to an all-solid-state battery whose constituent elements (particularly preferably all constituent elements) are formed of a solid in a narrow sense. In a preferred aspect, the solid-state battery in the present description is a stacked solid-state battery configured such that layers constituting a battery constituent unit are stacked on each other, and preferably such layers are formed of a sintered body. The "solid-state battery" includes not only a so-called "secondary battery" capable of repeating charging and discharging but also a "primary battery" capable of only discharging. In a preferred aspect, the "solid-state battery" is a secondary battery. The "secondary battery" is not excessively limited by the name, and may include, for example, an electrochemical device such as a "power storage device".

The term "plan view" used in the present specification is based on a form in a case where an object is captured from the upper side or the lower side along a thickness direction based on a stacking direction of layers constituting the solid-state battery, and includes a plan view (upper plan view and lower plan view). In addition, the term "sectional view" used in the present specification is based on a form in a case of being viewed from a direction substantially perpendicular to a thickness direction based on a stacking direction of the layers constituting the solid-state battery (to put it briefly, a form in a case of being cut along a plane parallel to the thickness direction), and includes a sectional view. In particular, the "sectional view" may be based on a form in a case of being cut out by a plane parallel to a thickness direction based on the stacking direction of each layer constituting the solid-state battery, the plane passing through the positive electrode terminal and the negative electrode terminal. The "vertical direction" and "horizontal direction" used directly or indirectly in the present specification correspond to a vertical direction and a horizontal direction in the drawings, respectively. Unless otherwise specified, the same reference numerals or symbols indicate the same members/portions or the same semantic contents. In one preferred aspect, it can be considered that a vertical downward direction (that is, a direction in which gravity acts) corresponds to a "downward direction" and the opposite direction corresponds to an "upward direction".

Figure 2:
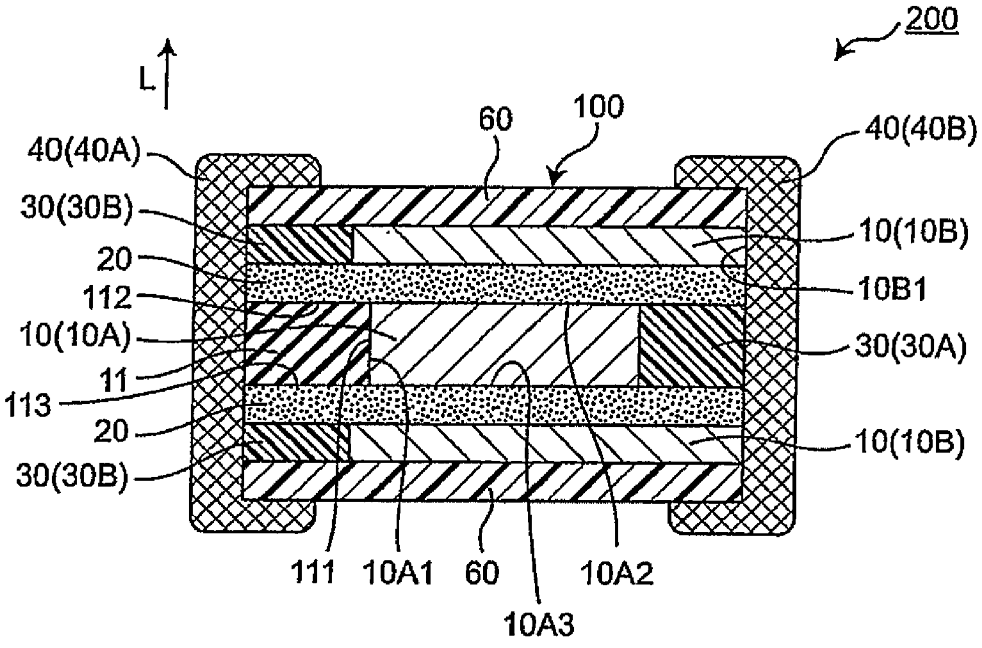
FIG. 2 is a schematic sectional view of the solid-state battery in FIG. 1 taken along line A-A as viewed in an arrow direction.
Figure 3:
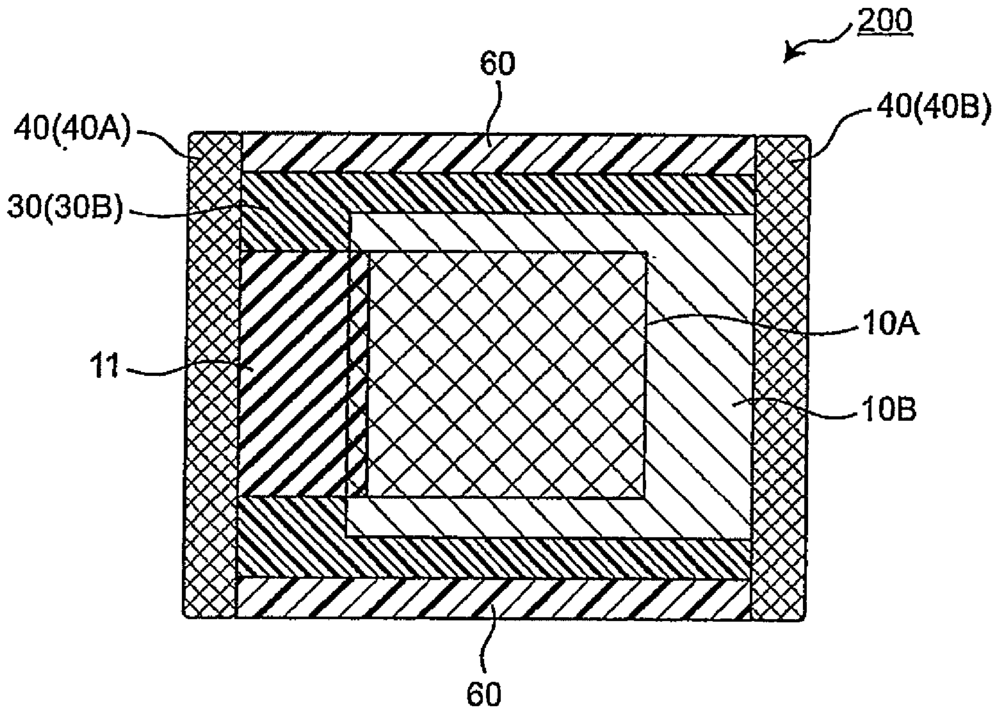
FIG. 3 is a plan view schematically illustrating the solid-state battery of FIG. 2, and is a plan perspective view relating to a positive electrode layer, a positive electrode current collecting portion, and a negative electrode layer.

For example, as illustrated in FIGS. 1, 2, and 3, a solid-state battery 200 according to the present invention includes a solid-state battery laminate 100 including at least one battery constituent unit including a positive electrode layer 10A, a negative electrode layer 10B, and a solid-state electrolyte layer 20 interposed therebetween, in a stacking direction L; and a positive electrode terminal 40A and a negative electrode terminal 40B respectively provided on side surfaces facing the solid-state battery laminate 100. In the solid-state battery laminate 100, the positive electrode layer 10A and the negative electrode layer 10B are alternately stacked with the solid-state electrolyte layer 20 interposed therebetween. FIG. 1 is an external perspective view schematically illustrating a solid-state battery according to an embodiment of the present invention. FIG. 2 is a schematic sectional view of the solid-state battery in FIG. 1 taken along line A-A as viewed in an arrow direction. FIG. 3 is a plan view schematically illustrating the solid-state battery of FIG. 2, and is a plan perspective view of the positive electrode layer 10A, a positive electrode current collecting portion 11, and the negative electrode layer 10B as seen through.

In the solid-state battery, each layer constituting the solid-state battery is formed by firing, and the positive electrode layer 10A, the negative electrode layer 10B, the solid-state electrolyte layer 20, and the like form a fired layer. Preferably, the positive electrode layer 10A, the negative electrode layer 10B, and the solid-state electrolyte layer 20 are each fired integrally with each other, and therefore the battery constituent unit forms an integrally sintered body.

(Positive Electrode Layer)

The positive electrode layer 10A has an end surface current collecting structure. The positive electrode layer 10A having the end surface current collecting structure means that the positive electrode layer 10A has a structure for collecting currents at an end surface 10A1 (particularly, only the end surface) of the positive electrode layer 10A. Specifically, the positive electrode layer 10A is in contact with the positive electrode current collecting portion 11 at the end surface 10A1 (particularly, only the end surface) of the positive electrode layer 10A, and is electrically connected to the positive electrode terminal 40A with the positive electrode current collecting portion 11 there between (particularly, only the positive electrode current collecting portion). The end surface 10A1 of the positive electrode layer 10A is a surface facing the positive electrode terminal 40A among surfaces (for example, side surfaces) connecting two main surfaces (that is, an upper surface 10A2 and a lower surface 10A3) perpendicular to the stacking direction L among outer surfaces constituting the positive electrode layer 10A. The main surface is a surface having a relatively large area. Performing current collection on the end surface 10A1 means that electrons enter and exit from the end surface 10A1 (particularly, only the end surface). In the present invention, since the positive electrode layer 10A has an end surface current collecting structure, a so-called current collecting layer which is essential for a main surface current collecting structure to be described later can be omitted. As a result, the number of stacking times can be reduced, the yield is improved, and the manufacturing cost can be suppressed. When the positive electrode layer 10A has a main surface current collecting structure to be described later, the number of stacking times is increased, so that the yield deteriorates and the manufacturing cost is also increased. The positive electrode layer 10A most preferably has a structure in which only the end surface 10A1 is in contact with the positive electrode current collecting portion 11, and at a boundary between the positive electrode layer 10A and the positive electrode current collecting portion 11, one of the positive electrode layer 10A and the positive electrode current collecting portion 11 may cover the other.

In the end surface current collecting structure of the positive electrode layer 10A, the positive electrode layer 10A does not necessarily have to be electrically connected to the positive electrode terminal 40A with the positive electrode current collecting portion 11 interposed therebetween, and for example, may be directly and electrically connected to the positive electrode terminal 40A while being in direct contact with the positive electrode terminal 40A at the end surface 10A1 (particularly, only the end surface) of the positive electrode layer 10A without interposing the positive electrode current collecting portion 11. From the viewpoint of efficiently exchanging ions with the negative electrode, the positive electrode layer 10A is preferably electrically connected to the positive electrode terminal 40A with the positive electrode current collecting portion 11 therebetween while being in contact with the positive electrode current collecting portion 11 at the end surface 10A1 (particularly, only the end surface) of the positive electrode layer 10A.

In a preferred aspect of the end surface current collecting structure of the positive electrode layer 10A, the positive electrode layer 10A and the positive electrode current collecting portion 11 are usually in contact with each other at end surfaces. In other words, the end surface 10A1 of the positive electrode layer 10A is in contact with an end surface 111 of the positive electrode current collecting portion 11. Therefore, as illustrated in FIG. 2, for example, the positive electrode layer 10A and the positive electrode current collecting portion 11 are configured to be adjacent to each other in a direction perpendicular to the stacking direction L in a sectional view. As illustrated in FIG. 3, for example, the positive electrode layer 10A and the positive electrode current collecting portion 11 are configured to be adjacent to each other in a direction perpendicular to the stacking direction L in a plan view as well.

The positive electrode current collecting portion 11 generally has an upper surface 112 which is flush with the upper surface 10A2 of the positive electrode layer 10A in the stacking direction L and a lower surface 113 which is flush with the lower surface 10A3 of the positive electrode layer 10A in the stacking direction L. The term "flush" means that there is no step between the two surfaces. The two surfaces are the upper surface 10A2 of the positive electrode layer 10A and the upper surface 112 of the positive electrode current collecting portion 11, and the lower surface 10A3 of the positive electrode layer 10A and the lower surface 113 of the positive electrode current collecting portion 11.

Figure 4A:
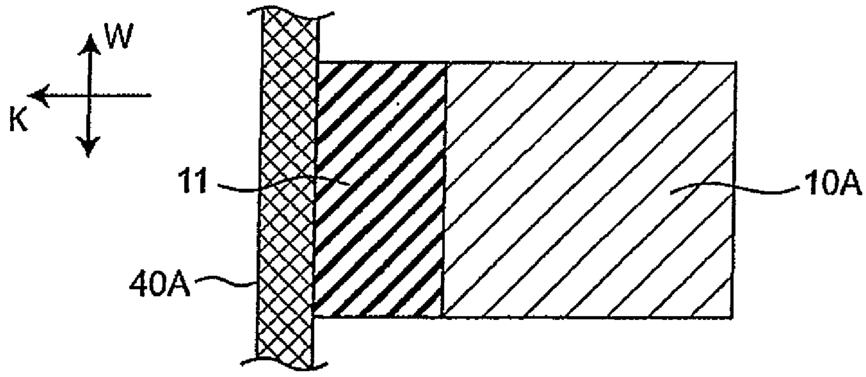
FIG. 4A is a plan view schematically illustrating the positive electrode current collecting portion and the vicinity thereof in the solid-state battery of FIG. 3.

As illustrated in FIG. 3 and FIG. 4A, the positive electrode current collecting portion 11 extends from the positive electrode layer 10A side toward the positive electrode terminal 40A side. In these drawings, the extending direction is indicated by "K". FIG. 4A is a plan view schematically illustrating the positive electrode current collecting portion and the vicinity thereof in the solid-state battery of FIG. 3.

In FIG. 3 and FIG. 4A, the positive electrode current collecting portion 11 has the same width direction W dimension as that of the positive electrode layer 10A in a plan view in the extending direction K, but is not limited thereto.

Figure 4B:
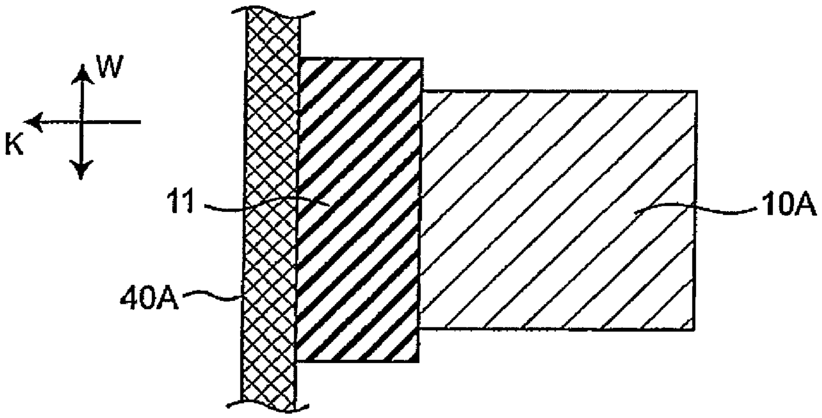
FIG. 4B is a plan view schematically illustrating another example of the positive electrode current collecting portion and the vicinity thereof in the solid-state battery of the present invention.

For example, as illustrated in FIG. 4B, the width direction W dimension of the positive electrode current collecting portion 11 in a plan view may be a width direction W dimension larger than that of the positive electrode layer 10A, and may be constant in the extending direction K.

Figure 4C:
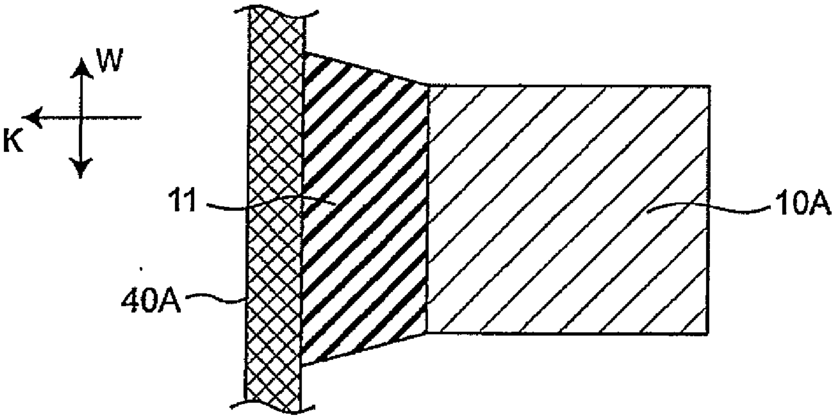
FIG. 4C is a plan view schematically illustrating another example of the positive electrode current collecting portion and the vicinity thereof in the solid-state battery of the present invention.

For example, as illustrated in FIG. 4C, the width direction W dimension of the positive electrode current collecting portion 11 in a plan view may gradually increase from the width direction W dimension equivalent to that of the positive electrode layer 10A toward the positive electrode terminal 40A (or the extending direction K).

The positive electrode current collecting portion 11 preferably has a plan view shape as illustrated in FIGS. 4B and 4C from the viewpoint of improving current collection efficiency due to a decrease in electric resistance based on an increase in a contact area between the positive electrode current collecting portion 11 and the positive electrode terminal 40A. FIG. 4B is a plan view schematically illustrating another example of the positive electrode current collecting portion and the vicinity thereof in the solid-state battery of the present invention. FIG. 4C is a plan view schematically illustrating another example of the positive electrode current collecting portion and the vicinity thereof in the solid-state battery of the present invention.

In FIG. 3 and FIGS. 4A to 4C, the positive electrode current collecting portion 11 is in contact with only one side of the positive electrode layer 10A in the plan view shape (for example, rectangular shape) in a plan view, but the present invention is not limited thereto.

Figure 4D:
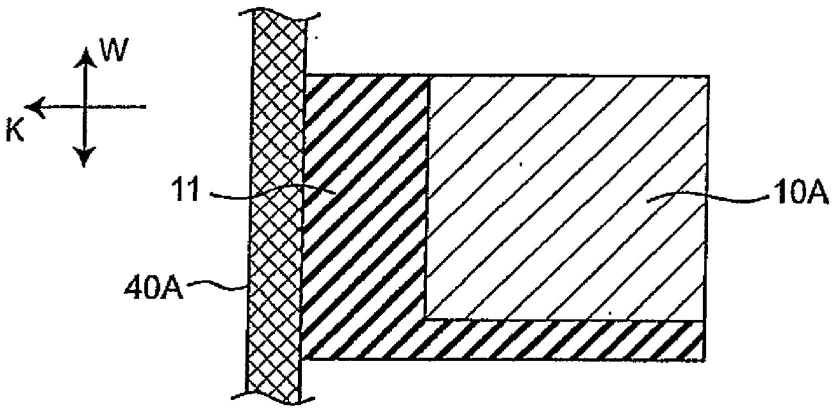
FIG. 4D is a plan view schematically illustrating another example of the positive electrode current collecting portion and the vicinity thereof in the solid-state battery of the present invention.

For example, as illustrated in FIG. 4D, the positive electrode current collecting portion 11 may be in contact with two sides of the positive electrode layer 10A in the plan view shape (for example, rectangular shape), in a plan view. Such a plan view shape of the positive electrode current collecting portion 11 is referred to as a two-side enclosed shape. FIG. 4D is a plan view schematically illustrating another example of the positive electrode current collecting portion and the vicinity thereof in the solid-state battery of the present invention.

Figure 4E:
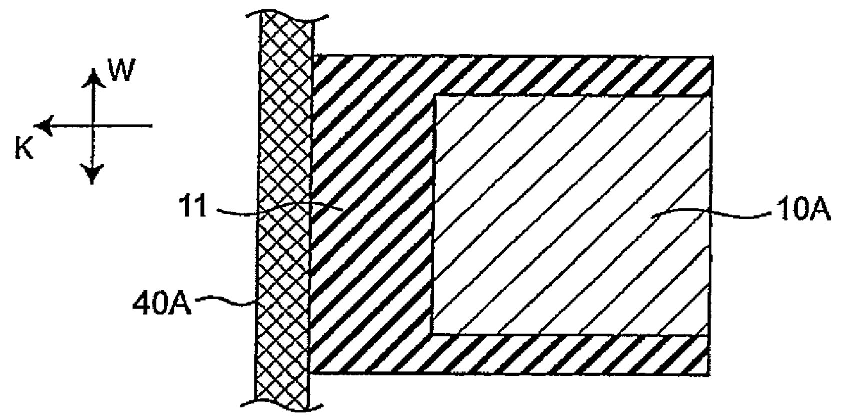
FIG. 4E is a plan view schematically illustrating another example of the positive electrode current collecting portion and the vicinity thereof in the solid-state battery of the present invention.

Further, for example, as illustrated in FIG. 4E, the positive electrode current collecting portion 11 may be in contact with three sides of the positive electrode layer 10A in the plan view shape (for example, rectangular shape), in a plan view. Such a plan view shape of the positive electrode current collecting portion 11 is referred to as a three-side enclosed shape. FIG. 4E is a plan view schematically illustrating another example of the positive electrode current collecting portion and the vicinity thereof in the solid-state battery of the present invention.

Figure 4F:
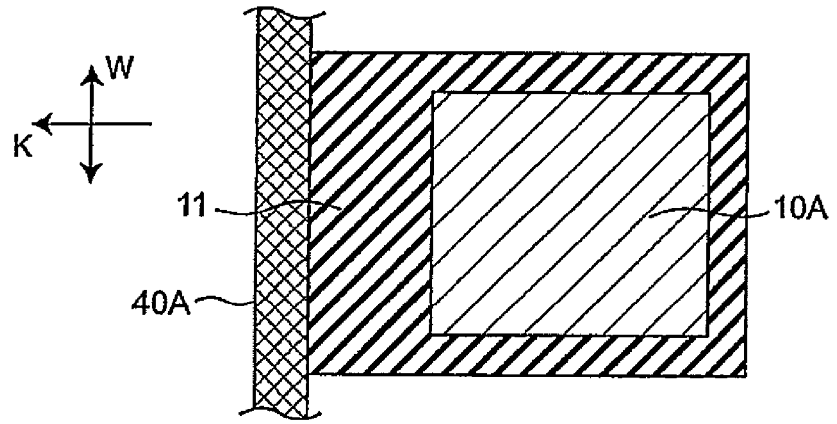
FIG. 4F is a plan view schematically illustrating another example of the positive electrode current collecting portion and the vicinity thereof in the solid-state battery of the present invention.

Further, for example, as illustrated in FIG. 4F, the positive electrode current collecting portion 11 may be in contact with four sides of the positive electrode layer 10A in the plan view shape (for example, rectangular shape), in a plan view. Such a plan view shape of the positive electrode current collecting portion 11 is referred to as a four-side enclosed shape. FIG. 4F is a plan view schematically illustrating another example of the positive electrode current collecting portion and the vicinity thereof in the solid-state battery of the present invention.

The positive electrode current collecting portion 11 preferably has a two- to four-side enclosed plan view shape as illustrated in FIGS. 4D, 4E, and 4F, more preferably has a three- to four-side enclosed plan view shape as illustrated in FIGS. 4E and 4F, and still more preferably has a four-side enclosed plan view shape as illustrated in FIG. 4F, from the viewpoint of improving the current collection efficiency by reducing the electric resistance based on the reduction in the average distance between a positive electrode active material and the positive electrode current collecting portion 11 in the positive electrode layer 10A.

Figure 5A:
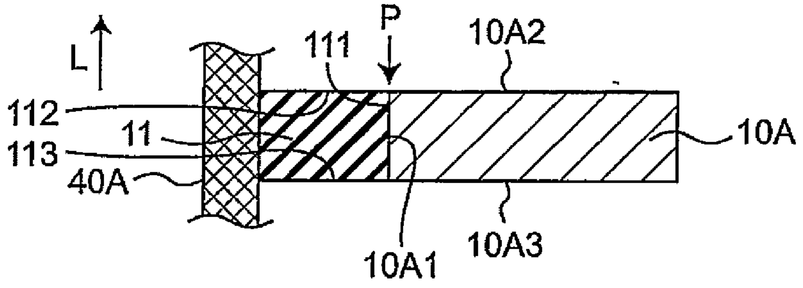
FIG. 5A is a sectional view schematically illustrating the positive electrode current collecting portion and the vicinity thereof in the solid-state battery of FIG. 3.

A boundary P between the end surface 111 of the positive electrode current collecting portion 11 on the positive electrode layer 10A side and the end surface 10A1 of the positive electrode layer 10A on the positive electrode current collecting portion 11 side has a sectional view shape indicated by a straight line parallel to the stacking direction L in the sectional view in FIGS. 2 and 5A, but is not limited thereto.

Figure 5B:
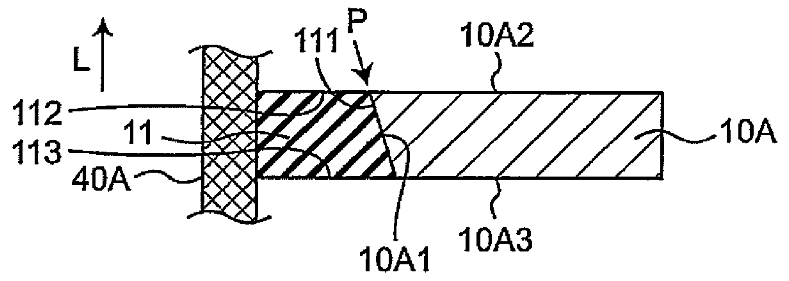
FIG. 5B is a sectional view schematically illustrating another example of the positive electrode current collecting portion and the vicinity thereof in the solid-state battery of the present invention.

For example, as illustrated in FIG. 5B, the boundary P may have a linearly inclined sectional view shape linearly moving away from the positive electrode terminal 40A from the upper surface (10A2, 112) side toward the lower surface (10A3, 113) side in the sectional view. FIG. 5B is a sectional view schematically illustrating another example of the positive electrode current collecting portion and the vicinity thereof in the solid-state battery of the present invention.

Figure 5C:
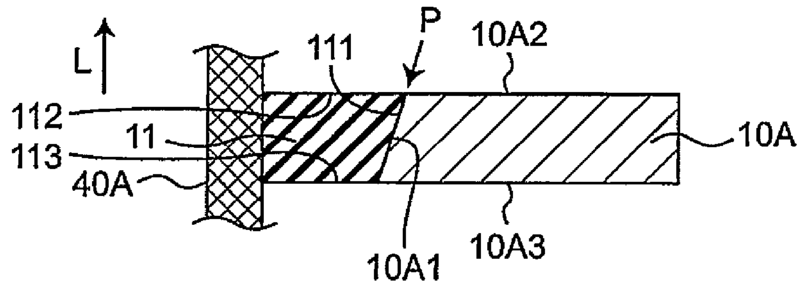
FIG. 5C is a sectional view schematically illustrating another example of the positive electrode current collecting portion and the vicinity thereof in the solid-state battery of the present invention.

For example, as illustrated in FIG. 5C, the boundary P may have a linearly inclined sectional view shape linearly approaching the positive electrode terminal 40A from the upper surface (10A2, 112) side toward the lower surface (10A3, 113) side in the sectional view. FIG. 5C is a sectional view schematically illustrating another example of the positive electrode current collecting portion and the vicinity thereof in the solid-state battery of the present invention.

Figure 5D:
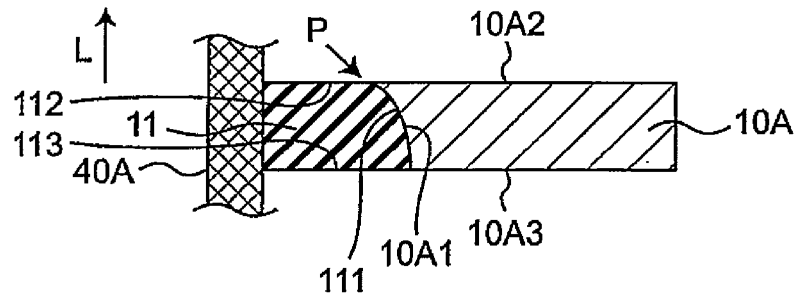
FIG. 5D is a sectional view schematically illustrating another example of the positive electrode current collecting portion and the vicinity thereof in the solid-state battery of the present invention.

For example, as illustrated in FIG. 5D, the boundary P may have a curved inclined sectional view shape moving away from the positive electrode terminal 40A in a curved manner from the upper surface (10A2, 112) side toward the lower surface (10A3, 113) side in the sectional view. FIG. 5D is a sectional view schematically illustrating another example of the positive electrode current collecting portion and the vicinity thereof in the solid-state battery of the present invention.

Figure 5E:
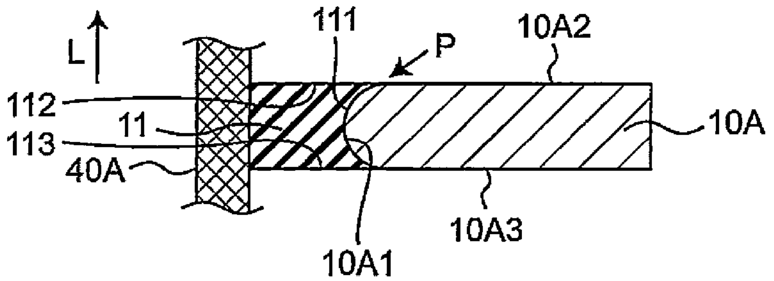
FIG. 5E is a sectional view schematically illustrating another example of the positive electrode current collecting portion and the vicinity thereof in the solid-state battery of the present invention.

For example, as illustrated in FIG. 5E, the boundary P may have a positive electrode current collecting portion side round protrusion type sectional view shape (for example, a positive electrode current collecting portion side semicircular protrusion type sectional view shape) in which the boundary P approaches the positive electrode terminal 40A in a curved manner and then moves away from the positive electrode current collecting portion side in a curved manner from the upper surface (10A2, 112) side toward the lower surface (10A3, 113) side in the sectional view. The positive electrode current collecting portion side round protrusion type sectional view shape is a sectional view shape protruding in a substantially round shape (for example, a substantially semicircular shape) toward the positive electrode current collecting portion side. FIG. 5E is a sectional view schematically illustrating another example of the positive electrode current collecting portion and the vicinity thereof in the solid-state battery of the present invention.

Figure 5F:
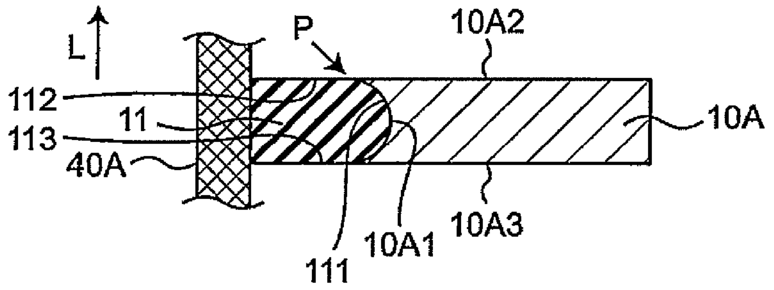
FIG. 5F is a sectional view schematically illustrating another example of the positive electrode current collecting portion and the vicinity thereof in the solid-state battery of the present invention.

For example, as illustrated in FIG. 5F, the boundary P may have a positive electrode layer side round protrusion type sectional view shape (for example, a positive electrode layer side semicircular protrusion type sectional view shape) in which the boundary P moves away from the positive electrode terminal 40A in a curved manner and then approaches the positive electrode layer side in a curved manner from the upper surface (10A2, 112) side toward the lower surface (10A3, 113) side in the sectional view. The positive electrode layer side round protrusion type sectional view shape is a sectional view shape protruding in a substantially round shape (for example, a substantially semicircular shape) toward the positive electrode layer side. FIG. 5F is a sectional view schematically illustrating another example of the positive electrode current collecting portion and the vicinity thereof in the solid-state battery of the present invention.

Figure 5G:
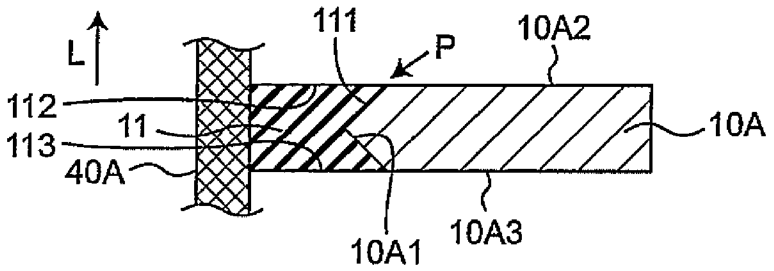
FIG. 5G is a sectional view schematically illustrating another example of the positive electrode current collecting portion and the vicinity thereof in the solid-state battery of the present invention.

For example, as illustrated in FIG. 5G, the boundary P may have a positive electrode current collecting portion side angular protrusion type sectional view shape (for example, a positive electrode current collecting portion side triangular protrusion type sectional view shape) in which the boundary P linearly approaches the positive electrode terminal 40A and then linearly moves away from the positive electrode current collecting portion side from the upper surface (10A2, 112) side toward the lower surface (10A3, 113) side in the sectional view. The positive electrode current collecting portion side angular protrusion type sectional view shape is a sectional view shape protruding in a substantially angular shape (for example, a substantially triangular shape) toward the positive electrode current collecting portion side. FIG. 5G is a sectional view schematically illustrating another example of the positive electrode current collecting portion and the vicinity thereof in the solid-state battery of the present invention.

Figure 5H:
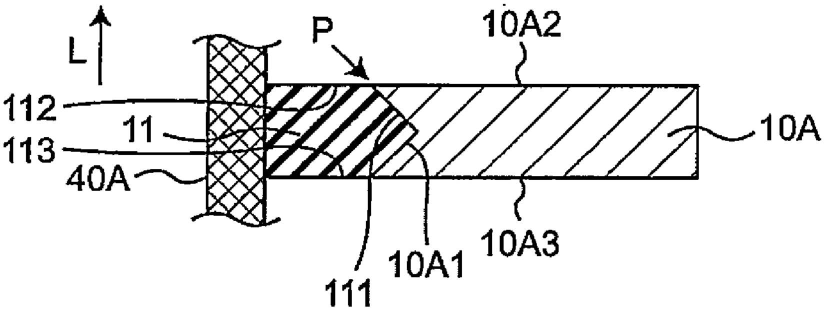
FIG. 5H is a sectional view schematically illustrating another example of the positive electrode current collecting portion and the vicinity thereof in the solid-state battery of the present invention.
Figure 5H:
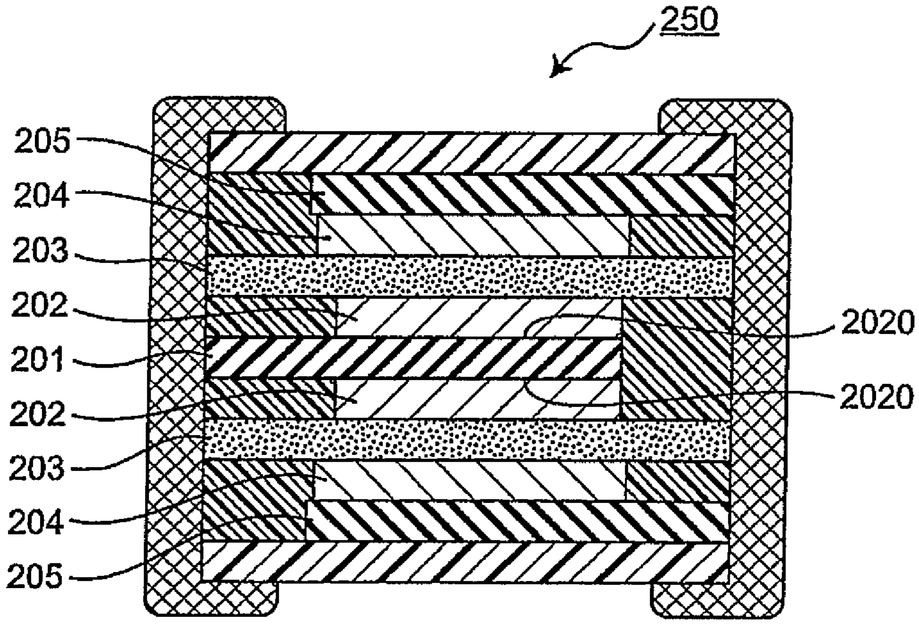

For example, as illustrated in FIG. 5H, the boundary P may have a positive electrode layer side angular protrusion type sectional view shape (for example, a positive electrode layer side triangular protrusion type sectional view shape) in which the boundary P linearly moves away from the positive electrode terminal 40A and then linearly approaches the positive electrode layer side from the upper surface (10A2, 112) side toward the lower surface (10A3, 113) side in the sectional view. The positive electrode layer side angular protrusion type sectional view shape is a sectional view shape protruding in a substantially angular shape (for example, a substantially triangular shape) toward the positive electrode layer side. FIG. 5H is a sectional view schematically illustrating another example of the positive electrode current collecting portion and the vicinity thereof in the solid-state battery of the present invention.

For example, the boundary P may have a composite sectional view shape formed by combining two or more of the above-described shapes.

The boundary P preferably has a linear or curved inclined sectional view shape as illustrated in FIGS. 5B, 5C, and 5D or a positive electrode current collecting portion side round protrusion type or a positive electrode current collecting portion side angular protrusion type sectional view shape as illustrated in FIGS. 5E and 5G, and more preferably has a positive electrode current collecting portion side round protrusion type or a positive electrode current collecting portion side angular protrusion type sectional view shape as illustrated in FIGS. 5E and 5G, from the viewpoint of improving the current collection efficiency due to a decrease in the electric resistance based on the increase in the contact area between the positive electrode layer 10A and the positive electrode current collecting portion 11.

The positive electrode layer 10A is an electrode layer formed by containing at least a positive electrode active material and a conductive carbon material. The positive electrode layer 10A may be formed by containing a solid electrolyte. In a preferred aspect, the positive electrode layer includes a sintered body including at least a positive electrode active material, a conductive carbon material, and a solid electrolyte. Since the positive electrode layer 10A contains the conductive carbon material, even when the solid-state battery does not include the positive electrode current collecting layer in order to improve the capacity density (for example, energy density), it is possible to sufficiently prevent a decrease in a theoretical capacity ratio calculated from the active material content and to sufficiently prevent a decrease in the capacity characteristics and the load characteristics as compared with a case where the solid-state battery does not contain the conductive material. When the positive electrode layer 10A does not contain the conductive carbon material, it is not possible to sufficiently prevent a decrease in the theoretical capacity ratio calculated from the active material content without the positive electrode current collecting layer. In the present specification, the positive electrode current collecting layer is a current collecting member that is formed on a main surface (or the entire surface) of the positive electrode layer, and as a result, is disposed adjacent to the positive electrode layer in a stacking direction of the positive electrode layer, the negative electrode layer, and the like. The positive electrode current collecting portion is a current collecting member formed between the positive electrode layer and the positive electrode terminal adjacent to the positive electrode layer in a direction perpendicular to the stacking direction of the positive electrode layer, the negative electrode layer, and the like, and is differently disposed from the positive electrode current collecting layer (particularly, in a direction adjacent to the positive electrode layer).

The positive electrode active material contained in the positive electrode layer 10A is a substance involved in the transfer of electrons in the solid-state battery. Ion movement (conduction) between the positive electrode layer and the negative electrode layer via the solid electrolyte and electron transfer between the positive electrode layer and the negative electrode layer via an external circuit are performed, and thereby the charging and discharging are performed. The positive electrode layer is particularly preferably a layer capable of occluding and releasing lithium ions or sodium ions (particularly lithium ions). That is, the solid-state battery of the present invention is preferably an all-solid-state secondary battery in which sodium ions or lithium ions (particularly, lithium ions) move between the positive electrode layer and the negative electrode layer with the solid electrolyte interposed therebetween to charge and discharge the battery.

The positive electrode active material is, for example, a lithium-containing compound. The kind of the lithium-containing compound is not particularly limited, and examples thereof include a lithium transition metal composite oxide and a lithium transition metal phosphate compound. The lithium transition metal composite oxide is a generic term for oxides containing lithium and one kind or two or more kinds of transition metal elements as constituent elements. The lithium transition metal phosphate compound is a generic term for phosphate compounds containing lithium and one kind or two or more kinds of transition metal elements as constituent elements. The kind of the transition metal element is not particularly limited, and examples thereof include cobalt (Co), nickel (Ni), manganese (Mn), and iron (Fe).

The lithium transition metal composite oxide is, for example, a compound represented by each of $Li_xM1O_2$ and $Li_yM2O_4$. The lithium transition metal phosphate compound is, for example, a compound represented by $Li_zM3PO_4$. However, each of M1, M2, and M3 is one kind or two or more kinds of transition metal elements. The respective values of x, y, and z are optional.

Specifically, the lithium transition metal composite oxide is, for example, $LiCoO_2$, $LiNiO_2$, $LiVO_2$, $LiCrO_2$, $LiMn_2O_4$, $LiCo_{1/3}Ni_{1/3}Mn_{1/3}O_2$, $LiNi_{0.5}Mn_{1.5}O_4$, or the like. Examples of the lithium transition metal phosphate compound include $LiFePO_4$, $LiCoPO_4$, and $LiMnPO_4$. The lithium transition metal composite oxide (particularly $LiCoO_2$) may contain a trace amount (about several %) of an additive element. Examples of the additive element include one or more elements selected from the group consisting of Al, Mg, Ni, Mn, Ti, Zr, boron, vanadium, chromium, iron, copper, zinc, molybdenum, tin, tungsten, zirconium, yttrium, niobium, calcium, strontium, bismuth, sodium, potassium, and silicon.

Examples of the positive electrode active material capable of occluding and releasing sodium ions include at least one selected from the group consisting of a sodium-containing phosphate compound having a NASICON-type structure, a sodium-containing phosphate compound having an olivine-type structure, a sodium-containing layered oxide, and a sodium-containing oxide having a spinel-type structure.

The content of the positive electrode active material in the positive electrode layer 10A is generally 50 mass % or more (that is, 50 to 100 mass %), and particularly 60 to 90 mass % with respect to the total amount of the positive electrode layer. The positive electrode layer may contain two or more kinds of positive electrode active materials, and in that case, the total content thereof may be within the above range.

The conductive carbon material contained in the positive electrode layer 10A is a carbon atom-containing material having conductivity. Examples of the conductive carbon material include one or more carbon materials selected from the group consisting of a columnar carbon material, a granular carbon material, a hollow carbon material, and a sheet-shaped carbon material. From the viewpoint of more sufficiently preventing a decrease in the theoretical capacity ratio, the capacity characteristics, and the load characteristics, the conductive carbon material is preferably one or more carbon materials selected from the group consisting of the columnar carbon material and the granular carbon material, and more preferably one or more carbon materials selected from the columnar carbon material.

The columnar carbon material is a carbon material having an elongated shape, in other words, a carbon material having an appearance shape extending in one direction. Specifically, the columnar carbon material is a carbon material that satisfies L/r of 3 or more where r is a maximum length connecting two points of a cross section of the carbon material when the thickest portion of the columnar shape is sliced, and L is a height (for example, longitudinal dimension) of the columnar shape. L/r of the columnar carbon material is usually 3 to 3000, and is preferably 10 to 500, more preferably 20 to 80, and still more preferably 30 to 50 from the viewpoint of more sufficiently preventing a decrease in the theoretical capacity ratio, the capacity characteristics, and the load characteristics.

r of the columnar carbon material is not particularly limited, and is preferably 5 to 500 nm, more preferably 20 to 400 nm, and still more preferably 100 to 300 nm from the viewpoint of more sufficiently preventing a decrease in the theoretical capacity ratio, the capacity characteristics, and the load characteristics.

L of the columnar carbon material is not particularly limited, and is preferably 2 to 20 μm and more preferably 3 to 20 μm from the viewpoint of more sufficiently preventing a decrease in the theoretical capacity ratio, the capacity characteristics, and the load characteristics.

In the present specification, L and r are average values of values measured for optional 100 carbon materials by electron microscope observation. L is the height of the columnar shape as described above, in other words, the maximum length in the longitudinal direction. As described above, r is the maximum length obtained by connecting two points of the cross section of the carbon material (particularly, the outer edge thereof) when the thickest portion of the columnar shape is sliced, in other words, the maximum length in the direction perpendicular to the longitudinal direction.

The columnar carbon material may have a hollow form or a solid form. The columnar carbon material includes a fibrous carbon material.

As commercially available products of carbon nanotubes that can be used as the columnar carbon material, for example, VGCF®-H(r=150 nm, L/r=40) available from Showa Denko K.K., GCNT s10 (r=10 to 20 nm, L/r=250 to 1200) available from SHENZHEN SUSN SINOTECH NEW MATERIALS CO., LTD., GCNT s40 (r=35 to 50 nm, L/r=100 to 400) available from SHENZHEN SUSN SINOTECH NEW MATERIALS CO., LTD., and the like can be obtained.

The granular carbon material is a substantially spherical conductive carbon material and does not have a hollow shell structure. Specifically, the granular carbon material is a carbon material having an average particle size of 10 to 90 nm, and the average particle size is preferably 20 to 80 nm, more preferably 30 to 70 nm, and still more preferably 40 to 60 nm from the viewpoint of more sufficiently preventing a decrease in the theoretical capacity ratio, the capacity characteristics, and the load characteristics.

The average particle size of the granular carbon material is an average primary particle size, and is an average value of values measured for 100 optional carbon materials by electron microscope observation. The average particle size is an average value of maximum lengths of individual particles.

As the granular carbon material, for example, carbon black or acetylene black can be used.

As commercially available products of carbon black, for example, Super C45 and Super C65 available from TIMCAL can be obtained.

As a commercially available product of acetylene black, for example, DENKA BLACK® available from Denka Company Limited can be obtained.

The hollow carbon material is a substantially spherical conductive carbon material and has a hollow shell structure. Specifically, the hollow carbon material is a carbon material having an average particle size of 10 to 80 nm, and the average particle size is preferably 20 to 70 nm and more preferably 30 to 50 nm from the viewpoint of more sufficiently preventing a decrease in the theoretical capacity ratio, the capacity characteristics, and the load characteristics.

The average particle size of the hollow carbon material is a value measured by the same method as the average particle size of the granular carbon material.

As the hollow carbon material, for example, Ketjen black can be used.

As a commercially available product of Ketjen black, for example, carbon ECP available from Lion Specialty Chemicals Co., Ltd. can be obtained.

The sheet-shaped carbon material is a sheet-shaped, scaly, or flaky conductive carbon material. Specifically, the sheet-shaped carbon material is a carbon material having an average thickness of 30 to 1000 nm and a maximum length of 1 to 15 μm. From the viewpoint of more sufficiently preventing a decrease in the theoretical capacity ratio, the capacity characteristics, and the load characteristics, the average thickness is preferably 60 to 500 nm.

The average thickness of the sheet-shaped carbon material is an average value of thicknesses measured for 100 optional carbon materials by electron microscope observation. The average thickness is an average value of minimum lengths of individual particles.

The maximum length of the sheet-shaped carbon material is an average value of maximum lengths measured for 100 optional carbon materials by electron microscope observation.

As the sheet-shaped carbon material, for example, natural graphite, artificial graphite, or graphene can be used.

As a commercial product of natural graphite, for example, scale-like graphite J-CPB available from Nippon Graphite Industries Co., Ltd. can be obtained.

As commercially available products of artificial graphite, for example, KS-6 and KS-15 available from Imerys Graphite & Carbon can be obtained.

The content of the conductive carbon material in the positive electrode layer 10A is not particularly limited, and is usually 0.5 mass % to 25 mass % with respect to the total amount of the positive electrode layer. When the positive electrode layer contains two or more kinds of conductive carbon materials, the total content thereof may be within the above range unless otherwise specified.

In a preferred embodiment (hereinafter, may be simply referred to as "embodiment A") from the viewpoint of more sufficiently preventing a decrease in the theoretical capacity ratio, the capacity characteristics, and the load characteristics, the conductive carbon material in the positive electrode layer 10A contains one or more carbon materials selected from the group consisting of the columnar carbon materials and the granular carbon materials, and the content of the conductive carbon material satisfies at least one of the following conditions A1 and A2:

Condition A1: The content of the columnar carbon material is 0.5 mass % to 12 mass % with respect to the total amount of the positive electrode layer; and Condition A2: The content of the granular carbon material is 1.5 mass % to 8 mass % with respect to the total amount of the positive electrode layer.

In the present embodiment A, for example, when the conductive carbon material contains one of the columnar carbon material and the granular carbon material, the content of the conductive carbon material satisfies one of the above conditions A1 and A2. That is, when the conductive carbon material includes the columnar carbon material, the content of the conductive carbon material satisfies the condition A1, and when the conductive carbon material includes the granular carbon material, the content of the conductive carbon material satisfies the condition A2.

For example, when the conductive carbon material includes both the columnar carbon material and the granular carbon material, the content of the conductive carbon material may satisfy at least one of the above conditions A1 and A2, and usually satisfies both of the above conditions A1 and A2.

The present embodiment A does not prevent that the positive electrode layer contains a conductive carbon material other than the columnar carbon material and the granular carbon material (sometimes referred to as "another conductive carbon material x"), and in this case, the content of the other conductive carbon material x is not particularly limited, and may be, for example, 10 mass % or less, particularly 5 mass % or less, and is usually 0 mass % with respect to the total amount of the positive electrode layer.

In a more preferred embodiment (hereinafter, may be simply referred to as "embodiment B") from the viewpoint of more sufficiently preventing a decrease in the theoretical capacity ratio, the capacity characteristics, and the load characteristics, the conductive carbon material in the positive electrode layer 10A contains one or more carbon materials selected from the group consisting of the columnar carbon materials and the granular carbon materials, and the content of the conductive carbon material satisfies at least one of the following conditions B1 and B2:

Condition B1: The content of the columnar carbon material is 0.5 mass % to 12 mass % with respect to the total amount of the positive electrode layer; and Condition B2: The content of the granular carbon material is 2.5 mass % to 5.5 mass % with respect to the total amount of the positive electrode layer.

In the present embodiment B, for example, when the conductive carbon material contains one of the columnar carbon material and the granular carbon material, the content of the conductive carbon material satisfies one of the above conditions B1 and B2. That is, when the conductive carbon material includes the columnar carbon material, the content of the conductive carbon material satisfies the condition B1, and when the conductive carbon material includes the granular carbon material, the content of the conductive carbon material satisfies the condition B2.

For example, when the conductive carbon material includes both the columnar carbon material and the granular carbon material, the content of the conductive carbon material may satisfy at least one of the above conditions B1 and B2, and usually satisfies both of the above conditions B1 and B2.

The present embodiment B does not prevent that the positive electrode layer contains a conductive carbon material other than the columnar carbon material and the granular carbon material (sometimes referred to as "another conductive carbon material x"), and in this case, the content of the other conductive carbon material x is not particularly limited, and may be, for example, 10 mass % or less, particularly 5 mass % or less, and is usually 0 mass % with respect to the total amount of the positive electrode layer.

In a more preferred embodiment (hereinafter, may be simply referred to as "embodiment C") from the viewpoint of more sufficiently preventing a decrease in the theoretical capacity ratio, the capacity characteristics, and the load characteristics, the conductive carbon material in the positive electrode layer 10A contains one or more carbon materials selected from the columnar carbon materials, and the content of the conductive carbon material satisfies the following condition C1:

Condition C1: The content of the columnar carbon material is 0.5 mass % to 4 mass %.

The present embodiment C does not prevent that the positive electrode layer contains a conductive carbon material other than the columnar carbon material (sometimes referred to as "another conductive carbon material y"), and in this case, the content of the other conductive carbon material y is not particularly limited, and may be, for example, 10 mass % or less, particularly 5 mass % or less, and is usually 0 mass % with respect to the total amount of the positive electrode layer.

Regarding a method for detecting the conductive carbon material, the presence of the conductive carbon material can be checked by SEM observation of the positive electrode layer.

Regarding a method for quantifying the conductive carbon material, the conductive carbon material can be quantified by performing TG-DTA measurement of the positive electrode layer.

A solid electrolyte which may be contained in the positive electrode layer 10A may be selected from, for example, the same material as the solid electrolyte which may be contained in the solid-state electrolyte layer described later.

The content of the solid electrolyte in the positive electrode layer 10A is not particularly limited, and is usually 10 mass % to 40 mass %, and particularly 20 mass % to 40 mass % with respect to the total amount of the positive electrode layer. The positive electrode layer may contain two or more kinds of solid electrolytes, and in that case, the total content thereof may be within the above range.

The positive electrode layer 10A may further contain a sintering aid. Examples of the sintering aid include at least one selected from the group consisting of lithium oxide, sodium oxide, potassium oxide, boron oxide, silicon oxide, bismuth oxide, and phosphorus oxide.

The thickness of the positive electrode layer 10A is not particularly limited, and may be, for example, 2 μm to 100 μm, particularly 5 μm to 50 μm.

The positive electrode current collecting portion 11 is a connecting portion (or a connecting layer) between the positive electrode layer 10A and the positive electrode terminal 40A, and contains at least a conductive material. The positive electrode current collecting portion 11 may further contain a solid electrolyte. In a preferred aspect, the positive electrode current collecting portion includes a sintered body including at least a conductive material and a solid electrolyte.

As the conductive material that may be contained in the positive electrode current collecting portion 11, a material having a relatively high conductivity is usually used, and for example, at least one selected from the group consisting of a carbon material, silver, palladium, gold, platinum, aluminum, copper, and nickel may be used.

The content of the conductive material in the positive electrode current collecting portion 11 is usually 30 mass % or more (that is, 30 mass % to 100 mass %), and particularly, 60 mass % to 90 mass % with respect to the total amount of the positive electrode current collecting portion. The positive electrode current collecting portion may contain two or more kinds of conductive materials, and in that case, the total content thereof may be within the above range.

The solid electrolyte which may be contained in the positive electrode current collecting portion 11 may be selected from, for example, the same material as the solid electrolyte which may be contained in the solid-state electrolyte layer described later.

The content of the solid electrolyte in the positive electrode current collecting portion 11 is not particularly limited, and is usually 10 mass % to 60 mass %, and particularly 20 mass % to 40 mass % with respect to the total amount of the positive electrode current collecting portion. The positive electrode current collecting portion may contain two or more kinds of solid electrolytes, and in that case, the total content thereof may be within the above range.

When the positive electrode current collecting portion has a form of a sintered body, the positive electrode current collecting portion 11 may further contain a sintering aid. A sintering agent contained in the positive electrode current collecting portion may be selected from, for example, the same material as the sintering aid that can be contained in the positive electrode layer.

The thickness of the positive electrode current collecting portion 11 is usually the same as the thickness of the positive electrode layer 10A, and may be selected from the same range as the thickness of the positive electrode layer 10A.

(Negative Electrode Layer)

The negative electrode layer 10B may have an end surface current collecting structure or a main surface current collecting structure. The negative electrode layer 10B preferably has an end surface current collecting structure from the viewpoint of further improving the capacity density (for example, energy density).

The negative electrode layer 10B having the end surface current collecting structure means that the negative electrode layer 10B has a structure for collecting currents at an end surface 10B1 (particularly, only the end surface) of the negative electrode layer 10B. Specifically, for example, as illustrated in FIGS. 2 and 3, the negative electrode layer 10B may be directly and electrically connected to the negative electrode terminal 40B at the end surface 10B1 (particularly, only the end surface) of the negative electrode layer 10B, or may be electrically connected to the negative electrode terminal with the negative electrode current collecting portion interposed therebetween while being in contact with a negative electrode current collecting portion (not shown) at the end surface 10B1 (particularly, only the end surface) of the negative electrode layer 10B. From the viewpoint of improving the current collection efficiency, as illustrated in FIGS. 2 and 3, the negative electrode layer 10B is preferably directly and electrically connected to the negative electrode terminal 40B at the end surface 10B1 (particularly, only the end surface) of the negative electrode layer 10B without interposing the negative electrode current collecting portion.

In the end surface current collecting structure of the negative electrode layer 10B, when the negative electrode layer 10B is electrically connected to the negative electrode terminal with the negative electrode current collecting portion (not shown), the negative electrode layer 10B and the negative electrode current collecting portion are configured to be in contact with each other at the end surfaces, and as a result, be adjacent to each other in a direction perpendicular to the stacking direction in a sectional view. The negative electrode layer and the negative electrode current collecting portion are also adjacent to each other in a direction perpendicular to the stacking direction in a plan view.

The negative electrode layer having the main surface current collecting structure means that the negative electrode layer has a structure for collecting currents at a main surface of the negative electrode layer. Specifically, the negative electrode layer is electrically connected to the negative electrode terminal with a negative electrode current collector while being in contact with the negative electrode current collector (particularly, the negative electrode current collecting layer) on the main surface of the negative electrode layer. In the main surface current collecting structure of the negative electrode layer, the negative electrode layer is stacked on the main surface of the negative electrode current collector (particularly, the negative electrode current collecting layer). The main surface is a surface having a relatively large area, specifically, an upper surface and/or a lower surface perpendicular to the stacking direction. Performing current collection on the main surface means that electrons enter and exit from the main surface.

The negative electrode layer 10B is an electrode layer containing at least a negative electrode active material. The negative electrode layer 10B may be formed by containing a solid electrolyte. In a preferred aspect, the negative electrode layer includes a sintered body including at least a negative electrode active material and a solid electrolyte.

The negative electrode active material contained in the negative electrode layer 10B is a substance involved in the transfer of electrons in the solid-state battery. Ion movement (conduction) between the positive electrode layer and the negative electrode layer via the solid electrolyte and electron transfer between the positive electrode layer and the negative electrode layer via an external circuit are performed, and thereby the charging and discharging are performed. The negative electrode layer is particularly preferably a layer capable of occluding and releasing a lithium ion or a sodium ion (particularly a lithium ion).

Examples of the negative electrode active material include a carbon material, a metal-based material, a lithium alloy, and a lithium-containing compound.

Specifically, the carbon material is, for example, graphite, graphitizable carbon, non-graphitizable carbon, mesocarbon microbeads (MCMB), or highly oriented graphite (HOPG). The carbon material as the negative electrode active material may be a sheet-shaped carbon material that can be used as the conductive carbon material of the positive electrode layer 10A.

The metal-based material is a generic term for materials containing any one kind or two or more kinds among metal elements and metalloid elements capable of forming an alloy with lithium as constituent elements. The metal-based material may be a simple substance, an alloy or a compound. Since the purity of the simple substance described here is not necessarily limited to 100%, the simple substance may contain a trace amount of impurities.

Examples of the metal element and the semi-gold group element include silicon (Si), tin (Sn), aluminum (Al), indium (In), magnesium (Mg), boron (B), gallium (Ga), germanium (Ge), lead (Pb), bismuth (Bi), cadmium (Cd), titanium (Ti), chromium (Cr), iron (Fe), niobium (Nb), molybdenum (Mo), silver (Ag), zinc (Zn), hafnium (Hf), zirconium (Zr), yttrium (Y), palladium (Pd), and platinum (Pt).

Specifically, the metal-based material is, for example, Si, Sn, $SiB_4$, $TiSi_2$, SiC, $Si_3N_4$, $SiO_v$ ($0<v\leq 2$), LiSiO, $SnO_w$ ($0<w\leq 2$), $SnSiO_3$, LiSnO, or $Mg_2Sn$.

Examples of the lithium-containing compound include a lithium transition metal composite oxide. The definition regarding the lithium transition metal composite oxide is as described above. Specifically, examples of the lithium transition metal composite oxide include $Li_3V_2(PO_4)_3$, $Li_3Fe_2(PO_4)_3$, $Li_4Ti_5O_{12}$., $LiTi_2(PO_4)_3$, and $LiCuPO_4$.

Examples of the negative electrode active material capable of occluding and releasing a sodium ion include at least one selected from the group consisting of a sodium-containing phosphate compound having a NASICON-type structure, a sodium-containing phosphate compound having an olivine-type structure, and a sodium-containing oxide having a spinel-type structure.

The content of the negative electrode active material in the negative electrode layer 10B is usually 50 mass % or more (that is, 50 mass % to 100 mass %), and particularly 60 mass % to 90 mass % with respect to the total amount of the negative electrode layer. The negative electrode layer may contain two or more kinds of negative electrode active materials, and in that case, the total content thereof may be within the above range.

A solid electrolyte which may be contained in the negative electrode layer 10B may be selected from, for example, the same material as the solid electrolyte which may be contained in the solid-state electrolyte layer described later.

The content of the solid electrolyte in the negative electrode layer 10B is not particularly limited, and is usually 10 mass % to 40 mass %, and particularly 20 mass % to 40 mass % with respect to the total amount of the negative electrode layer. The negative electrode layer may contain two or more kinds of solid electrolytes, and in that case, the total content thereof may be within the above range.

The negative electrode layer 10B may further contain a sintering aid. Examples of the sintering aid include the same materials as the sintering aid that may be contained in the positive electrode layer 10A.

The thickness of the negative electrode layer 10B is not particularly limited, and may be, for example, 2 μm to 100 μm, particularly 5 μm to 50 μm.

When the negative electrode layer 10B is electrically connected to the negative electrode terminal 40B with the negative electrode current collecting portion interposed therebetween, the negative electrode current collecting portion may be made of the same constituent material as the positive electrode current collecting portion 11 described above.

(Solid-State Electrolyte Layer)

The solid-state electrolyte layer 20 is a layer containing at least a solid electrolyte. In a preferred aspect, the solid-state electrolyte layer is formed of a sintered body containing at least a solid electrolyte.

The solid electrolyte constituting the solid-state electrolyte layer 20 is a material capable of conducting a lithium ion or a sodium ion (particularly, a lithium ion). In particular, the solid electrolyte forms a layer through which, for example, a lithium ion or a sodium ion (particularly, a lithium ion) can be conducted between the positive electrode layer and the negative electrode layer. The solid electrolyte may be provided at least between the positive electrode layer and the negative electrode layer. That is, the solid electrolyte may also exist around the positive electrode layer and/or the negative electrode layer so as to protrude from between the positive electrode layer and the negative electrode layer. Specific examples of the solid electrolyte include any one or more of crystalline solid electrolytes, glass ceramic-based solid electrolytes, and the like.

The crystalline solid electrolyte is a crystalline electrolyte. Specifically, the crystalline solid electrolyte is, for example, an inorganic material or a polymer material, and the inorganic material is, for example, sulfide, or oxide. Examples of the sulfide include $Li_2S—P_2S_5$, $Li_2S—SiS_2—Li_3PO_4$, $Li_7P_3S_{11}$, $Li_{3.25}Ge_{0.25}P_{0.75}S$, and $Li_{10}GeP_2S_{12}$. Examples of phosphorus oxide include $Li_xM_y(PO_4)_3$ ($1\leq x\leq 2$, $1\leq y\leq 2$, and M is at least one selected from the group consisting of Ti, Ge, Al, Ga, and Zr), $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$, $La_{2/3-x}Li_{3x}TiO_3$, $Li_{1.2}Al_{0.2}Ti_{1.8}(PO_4)_3$, $La_{0.55}Li_{0.35}TiO_3$, and $Li_7La_3Zr_2O_{12}$. The polymer material is, for example, polyethylene oxide (PEO).

The glass ceramic-based solid electrolyte is an electrolyte in which amorphous and crystalline are mixed. The glass ceramic-based solid electrolyte is, for example, an oxide containing lithium (Li), silicon (Si), and boron (B) as constituent elements, and more specifically contains lithium oxide ($Li_2O$), silicon oxide ($SiO_2$), boron oxide ($B_2O_3$), and the like. The ratio of the content of lithium oxide to the total content of lithium oxide, silicon oxide, and boron oxide is not particularly limited, and is, for example, 40 mol % to 73 mol %. The ratio of the content of silicon oxide to the total content of lithium oxide, silicon oxide, and boron oxide is not particularly limited, and is, for example, 8 mol % to 40 mol %. The ratio of the content of boron oxide to the total content of lithium oxide, silicon oxide, and boron oxide is not particularly limited, and is, for example, 10 mol % to 50 mol %. In order to measure the content of each of lithium oxide, silicon oxide, and boron oxide, a glass ceramic-based solid electrolyte is analyzed using, for example, inductively coupled plasma atomic emission spectrometry (ICP-AES) or the like.

Examples of the solid electrolyte capable of conducting a sodium ion include a sodium-containing phosphate compound having a NASICON structure, an oxide having a perovskite structure, and an oxide having a garnet-type structure or a garnet-type similar structure. Examples of the sodium-containing phosphate compound having a NASI- CON structure include $Na_xM_y(PO_4)_3$ ($1 \leq x \leq 2$, $1 \leq y \leq 2$, and M is at least one selected from the group consisting of Ti, Ge, Al, Ga, and Zr).

The solid-state electrolyte layer 20 may further contain a sintering aid. Examples of the sintering aid include the same materials as the sintering aid that may be contained in the positive electrode layer 10A.

The thickness of the solid-state electrolyte layer is not particularly limited, and may be, for example, 1 μm to 40 μm, particularly 1 μm to 15 μm.

(Electrode Separation Portion)

The solid-state battery 200 of the present invention usually further includes an electrode separation portion (also referred to as a "margin layer" or a "margin portion") 30 (30A, 30B).

An electrode separation portion 30A (positive electrode separation portion) is disposed around the positive electrode layer 10A, thereby separating the positive electrode layer 10A from the negative electrode terminal 40B. An electrode separation portion 30B (negative electrode separation portion) is disposed around the negative electrode layer 10B, thereby separating the negative electrode layer 10B from the positive electrode terminal 40A. Although not particularly limited, the electrode separation portion 30 is preferably formed of, for example, a solid electrolyte, an insulating material, a mixture thereof. or the like.

As the solid electrolyte that can constitute the electrode separation portion 30, the same material as the solid electrolyte that can constitute the solid-state electrolyte layer can be used.

The insulating material that can form the electrode separation portion 30 may be a material that does not conduct electricity, that is, a non-conductive material. Although not particularly limited, the insulating material may be formed of, for example, a glass material, a ceramic material, or the like. For example, a glass material may be selected as the insulating material. Although not particularly limited, examples of the glass material include at least one selected from the group consisting of soda lime glass, potash glass, borate glass, borosilicate glass, barium borosilicate glass, zinc borate glass, barium borate glass, bismuth borosilicate glass, bismuth zinc borate glass, bismuth silicate glass, phosphate glass, aluminophosphate glass, and zinc phosphate glass. Although not particularly limited, examples of the ceramic material include at least one selected from the group consisting of aluminum oxide ($Al_2O_3$), boron nitride (BN), silicon dioxide ($SiO_2$), silicon nitride ($Si_3N_4$), zirconium oxide ($ZrO_2$), aluminum nitride (AlN), silicon carbide (SiC), and barium titanate ($BaTiO_3$).

(Terminal)

The solid-state battery 200 of the present invention is generally provided with a terminal 40 (40A, 40B). In particular, the terminals 40A and 40B of the positive and negative electrodes are provided to form a pair on the side surface of the solid-state battery. More specifically, the terminal 40A on the positive electrode side connected to the positive electrode layer 10A and the terminal 40B on the negative electrode side connected to the negative electrode layer 10B are provided so as to form a pair. As such a terminal 40 (40A, 40B), it is preferable to use a material having high conductivity. The material 40 of the terminal is not particularly limited, and examples thereof include at least one conductive material selected from the group consisting of silver, gold, platinum, aluminum, copper, tin, and nickel. The positive electrode terminal 40A and the negative electrode terminal 40B are formed on side surfaces opposing the solid-state battery laminate 100, and the side surfaces can be regarded as end surfaces of the solid-state battery laminate, and these terminals can be regarded as electrodes of a battery in relation to the outside of the battery. Therefore, the positive electrode terminal 40A and the negative electrode terminal 40B can be referred to as a positive electrode end surface electrode and a negative electrode end surface electrode, respectively.

(Outer Layer Material)

The solid-state battery 200 of the present invention usually further includes an outer layer material 60.

The outer layer material 60 may be generally formed on the outermost side of the solid-state battery, and is for electrically, physically, and/or chemically protecting the solid-state battery. As a material constituting the outer layer material 60, it is preferable that the material is excellent in insulation property, durability and/or moisture resistance, and is environmentally safe. For example, glass, ceramics, a thermosetting resin, a photocurable resin, a mixture thereof, or the like may be used.

As the glass that can constitute the outer layer material, the same material as the glass material that can constitute the electrode separation portion can be used.

As the ceramic material that can constitute the outer layer material, the same material as the ceramic material that can constitute the electrode separation portion can be used.

[Method for Manufacturing Solid-State Battery]

The solid-state battery of the present invention can be manufactured by a printing method such as a screen printing method, a green sheet method using a green sheet, or a composite method thereof. Hereinafter, a case where the printing method and the green sheet method are adopted for understanding the present invention will be described in detail, but the present invention is not limited to these methods.

(Step of Forming Solid-State Battery Laminate Precursor)

In this step, for example, several types of pastes such as a paste for a positive electrode layer, a paste for a negative electrode layer, a paste for a solid-state electrolyte layer, a paste for a positive electrode current collecting portion, a paste for an electrode separation portion, and a paste for an outer layer material are used as inks. That is, a solid-state battery laminate precursor having a predetermined structure is formed on a support substrate by applying and drying the paste by a printing method.

In the printing, a solid-state battery laminate precursor corresponding to a predetermined solid-state battery structure can be formed on a substrate by sequentially stacking printing layers with a predetermined thickness and pattern shape. The type of the pattern forming method is not particularly limited as long as it is a method capable of forming a predetermined pattern, and is, for example, any one or more of a screen printing method, a gravure printing method, and the like.

The paste can be prepared by wet-mixing a predetermined constituent material of each layer appropriately selected from the group consisting of positive electrode active material particles, negative electrode active material particles, a conductive material, a solid electrolyte material, a current collecting portion material, an insulating material, a sintering aid, and other materials, and an organic vehicle in which an organic material is dissolved in a solvent.

The paste for a positive electrode layer contains, for example, positive electrode active material particles, a conductive carbon material, a solid electrolyte material, an organic material, and a solvent, and a sintering aid as desired.

The paste for a negative electrode layer contains, for example, negative electrode active material particles, a solid electrolyte material, an organic material, and a solvent, and a sintering aid as desired.

The paste for a solid-state electrolyte layer contains, for example, a solid electrolyte material, an organic material, and a solvent, and a sintering aid as desired.

The paste for a positive electrode current collecting portion contains a conductive material, an organic material, and a solvent, and a sintering aid as desired.

The paste for an electrode separation portion contains, for example, a solid electrolyte material, an insulating material, an organic material, and a solvent, and a sintering aid as desired.

The paste for an outer layer material contains, for example, an insulating material, an organic material, and a solvent, and a sintering aid as desired.

The organic material that can be contained in the paste is not particularly limited, and at least one polymer material selected from the group consisting of a polyvinyl acetal resin, a cellulose resin, a polyacrylic resin, a polyurethane resin, a polyvinyl acetate resin, a polyvinyl alcohol resin, and the like can be used.

The kind of the solvent is not particularly limited, and is, for example, any one kind or two or more kinds among organic solvents such as butyl acetate, N-methyl-pyrrolidone, toluene, terpineol, and N-methyl-pyrrolidone.

In the wet mixing, a medium can be used, and specifically, a ball mill method, a viscomill method, or the like can be used. On the other hand, a wet mixing method without using a medium may be used, and a sandmill method, a high-pressure homogenizer method, or a kneader dispersion method can be used.

The support substrate is not particularly limited as long as it is a support capable of supporting each paste layer, and is, for example, a release film having one surface subjected to a release treatment. Specifically, a substrate formed of a polymer material such as polyethylene terephthalate can be used. When the paste layer is subjected to a firing step while being held on the substrate, a substrate having heat resistance to a firing temperature may be used as the substrate.

Alternatively, each green sheet may be formed from each paste, and the obtained green sheets may be stacked to prepare a solid-state battery laminate precursor.

Specifically, a support substrate to which each paste is applied is dried on a hot plate heated to 30° C. or higher and 50° C. or lower to form a positive electrode layer green sheet, a negative electrode layer green sheet, a solid-state electrolyte layer green sheet, a positive electrode current collecting portion green sheet, an electrode separation portion green sheet, and/or an outer layer material green sheet having a predetermined shape and thickness on a support substrate (for example, a PET film).

Next, each green sheet is peeled off from the substrate. After the peeling, the green sheets for the respective constituent elements are sequentially stacked along the stacking direction to form a solid-state battery laminate precursor. After the stacking, the solid-state electrolyte layer, the insulating layer and/or the protective layer may be provided to the side region of the electrode green sheet by screen printing.

(Firing Step)

In the firing step, the solid-state battery laminate precursor is subjected to firing. Although it is merely an example, the firing is performed by removing the organic material in a nitrogen gas atmosphere containing oxygen gas or in the atmosphere, for example, by heating at 200° C. or higher, and then heating the organic material in a nitrogen gas atmosphere or in the atmosphere, for example, at 300° C. or higher. The firing may be performed while pressurizing the solid-state battery laminate precursor in the stacking direction (in some cases, the stacking direction and a direction perpendicular to the stacking direction).

By undergoing such firing, a solid-state battery laminate is formed, and a desired solid-state battery is finally obtained.

(Step of Forming Positive Electrode Terminal and Negative Electrode Terminal)

For example, a positive electrode terminal is bonded to the solid-state battery laminate using a conductive adhesive, and a negative electrode terminal is bonded to the solid-state battery laminate using a conductive adhesive. As a result, each of the positive electrode terminal and the negative electrode terminal is attached to the solid-state battery laminate body, so that a solid-state battery is completed.

Although the embodiments of the present invention have been described above, only typical examples have been illustrated. Therefore, those skilled in the art will easily understand that the present invention is not limited thereto, and various aspects are conceivable without changing the gist of the present invention.

EXAMPLES

<Conductive Material>

As the conductive material, the following materials were used.

(Columnar Conductive Carbon Material)

Carbon nanotube A: GCNT s10 (r=10 to 20 nm, L/r=250 to 1200) available from SHENZHEN SUSN SINOTECH NEW MATERIALS CO., LTD.

Carbon nanotube B: GCNT s40 (r=35 to 50 nm, L/r=100 to 400) available from SHENZHEN SUSN SINOTECH NEW MATERIALS CO., LTD.

Carbon nanotube C: VGCF®-H(r=150 nm L/r=40) available from Showa Denko K.K.

(Granular Conductive Carbon Material)

DENKA BLACK (acetylene black): DENKA BLACK® available from Denka Company Limited, average particle size: 48 nm (Hollow Conductive Carbon Material)

Ketjen black: carbon ECP available from Lion Specialty Chemicals Co., Ltd., average particle size: 40 nm (Sheet-Shaped Conductive Carbon Material)

KS-6 (artificial graphite): KS-6 available from Imerys Graphite & Carbon, Average thickness: 100 nm, Maximum length: about 3 to 6 μm

Example 1

(Step of Preparing Green Sheet for Solid-State Electrolyte Layer Preparation)

First, as a solid electrolyte, lithium-containing oxide glass and an acrylic binder were mixed at a mass ratio of lithium-containing oxide glass:acrylic binder=70:30. As the lithium-containing oxide glass, one having a composition of $Li_2O$:$SiO_2$:$B_2O_3$=60:10:30 (mol % ratio) was used. Next, the obtained mixture was mixed with butyl acetate so that the solid content was 30 mass %, and the mixture was stirred together with zirconia balls having a diameter of 5 mm for 4 hours to obtain a paste for preparing a solid-state electrolyte layer. Subsequently, the paste was applied onto a release film and dried at 80° C. for 10 minutes to prepare a green sheet for preparing a solid-state electrolyte layer as a solid-state electrolyte layer precursor.

(Production of Green Sheet for Preparing Positive Electrode Active Material Layer)

First, lithium cobaltate ($LiCoO_2$) as a positive electrode active material and lithium-containing oxide glass as a solid electrolyte were mixed at a mass ratio of lithium cobaltate: lithium-containing oxide glass=70:30. As the lithium-containing oxide glass, one having a composition of $Li_2O$:$SiO_2$:$B_2O_3$=60:10:30 (mol % ratio) was used. Next, the conductive material was mixed so that the obtained mixture and the conductive material had a ratio of 100-x:x. Furthermore, the obtained mixture and the acrylic binder were mixed at a mass ratio of mixture (lithium cobaltate+lithium-containing oxide glass+conduction aid):acrylic binder=70:30, and then this was mixed with butyl acetate so that the solid content was 30 mass %. Then, the obtained mixture was stirred together with zirconia balls having a diameter of 5 mm for 4 hours to obtain a paste for preparing a positive electrode active material layer. Subsequently, the paste was applied onto a release film and dried at 80° C. for 10 minutes to prepare a green sheet for preparing a positive electrode active material layer as a positive electrode layer precursor.

(Step of Preparing Green Sheet for Negative Electrode Active Material Layer Preparation)

First, carbon powder (KS6 available from TIMCAL) as a negative electrode active material and lithium-containing oxide glass as a solid electrolyte were mixed at a mass ratio of carbon powder:lithium-containing oxide glass=70:30. As the lithium-containing oxide glass, one having a composition of $Li_2O$:$SiO_2$:$B_2O_3$=60:10:30 (mol % ratio) was used. Next, the obtained mixture and the acrylic binder were mixed at a mass ratio of mixture (carbon powder+lithium-containing oxide glass):acrylic binder=70:30, and then this was mixed with butyl acetate so that the solid content was 30 mass %. Then, the obtained mixture was stirred together with zirconia balls having a diameter of 5 mm for 4 hours to obtain a paste for preparing a negative electrode active material layer. Subsequently, the paste was applied onto a release film and dried at 80° C. for 10 minutes to prepare a green sheet for preparing a negative electrode active material layer as a negative electrode active material layer precursor.

(Step of Preparing Green Sheet for Positive Electrode Current Collecting Portion Preparation)

First, carbon powder (KS6 available from TIMCAL) as a conductive material and lithium-containing oxide glass as a solid electrolyte were mixed at a mass ratio of carbon powder:lithium-containing oxide glass=70:30. As the lithium-containing oxide glass, one having a composition of $Li_2O$:$SiO_2$:$B_2O_3$=60:10:30 (mol % ratio) was used. Next, the obtained mixture and the acrylic binder were mixed at a mass ratio of mixture (carbon powder+lithium-containing oxide glass):acrylic binder=70:30, and then this was mixed with butyl acetate so that the solid content was 30 mass %. Then, the obtained mixture was stirred together with zirconia balls having a diameter of 5 mm for 4 hours to obtain a paste for preparing a positive electrode current collecting portion. Subsequently, the paste was applied onto a release film and dried at 80° C. for 10 minutes to prepare a green sheet for preparing a positive electrode current collecting portion as a positive electrode current collecting portion precursor.

(Step of Preparing Green Sheet for Outer Layer Material Preparation)

First, alumina particle powder (AHP 300 available from Nippon Light Metal Company, Ltd.) as particle powder and lithium-containing oxide glass (B) as a solid electrolyte were mixed at a mass ratio of alumina particle powder:lithium-containing oxide glass (B)=50:50. Next, the obtained mixture and the acrylic binder were mixed at a mass ratio of mixture (alumina particle powder+lithium-containing oxide glass (B)):acrylic binder=70:30, and then this was mixed with butyl acetate so that the solid content was 30 mass %. Then, the obtained mixture was stirred together with zirconia balls having a diameter of 5 mm for 4 hours to obtain a paste for preparing a main surface exterior material. Subsequently, the paste was applied onto a release film and dried at 80° C. for 10 minutes to prepare a green sheet for preparing an outer layer material as a main surface outer layer material precursor.

(Step of Preparing Green Sheet for Electrode Separation Portion Preparation)

A green sheet for producing an electrode separation portion was produced as an electrode separation portion precursor in the same manner as in the "step of preparing a green sheet for outer layer material preparation" described above.

(Step of Preparing Laminate)

Using each green sheet obtained as described above, a laminate having the configuration illustrated in FIGS. 1 and 2 was prepared as follows. First, each green sheet was processed into the shape illustrated in FIGS. 1 and 2, and then released from a release film. Subsequently, the green sheets were sequentially stacked so as to correspond to the configuration of the battery element illustrated in FIGS. 1 and 2, and then heat pressure-bonded at 100° C. for 10 minutes. As a result, a laminate as a battery element precursor was obtained.

(Step of Sintering Laminate)

The obtained laminate was heated to remove an acrylic binder contained in each green sheet, and then further heated to sinter the oxide glass contained in each green sheet.

(Step of Preparing Terminal)

First, Ag powder (Daiken Chemical Co., Ltd.) and oxide glass (Bi—B glass, available from Asahi Glass Co., Ltd., ASF 1096) were mixed at a predetermined mass ratio as conductive particle powder. Next, the obtained mixture and the acrylic binder were mixed at a mass ratio of mixture (Ag powder+oxide glass):acrylic binder=70:30, and then this was mixed with a butyl acetate solvent so that the solid content was 50 mass %. Then, the obtained mixture was stirred together with zirconia balls having a diameter of 5 mm for 4 hours to obtain a conductive paste. Next, the conductive paste was applied onto the release film, and then the conductive paste was attached to the first and second end surfaces (or side surfaces) of the laminate in which the positive electrode current collecting portion and the negative electrode active material layer were exposed, respectively, and sintered at 400° C. for 1 hour to form a positive electrode and a negative electrode terminal. As a result, a target battery was obtained.

(Evaluation 1: Capacity Characteristics)

The capacity characteristics mean capacity characteristics exhibited when a cell is produced in a structure (main surface current collecting structure) in which a moving distance of electrons is only equal to an electrode thickness. In other words, the capacity characteristics are capacity characteristics when it is assumed that the secondary battery (in particular, the electrode) has a main surface current collecting structure. As long as the main surface current collecting structure is adopted, the capacity that can be taken out is larger when the conduction aid is not contained. This is because the contact area between the active material and the solid electrolyte is large. On the other hand, when a cell containing the conduction aid in the positive electrode active material layer is produced in the same main surface current collecting structure, the capacity decreases. This is considered to be because the presence of the conduction aid at an interface between the active material and the solid electrolyte hinders ion transport.

Specifically, the produced battery was CCCV (constant current and constant voltage) charged at a current of 0.05 C with respect to the rated capacity at 4.35 V until reaching 0.01 C, and after a quiescent time of 10 minutes was provided, CC (constant current) discharge was performed at 0.05 C until reaching 3 V, and the discharge capacity C was evaluated. When the discharge capacity in each Example/Comparative Example was defined as Cx, the relative capacity ratio R1 to the discharge capacity Cc1 in Comparative Example 1 in which the positive electrode layer did not contain a conductive material was calculated. The larger the ratio, the better the capacity characteristics.

$$R1(\%)=\{(Cx-Cc1)/Cc1\}\times 100$$

R1(%) was evaluated according to the following criteria:

⊙⊙: −2%≤R1 (premium);

⊙: −8%≤R1<−2% (best);

○: −11%≤R1<−8% (good);

Δ: −20%≤R1<−11% (acceptable (no problem in practical use));

X: R1<−20 (there is a problem in practical use).

(Evaluation 2: Load Characteristics)

The load characteristics mean load characteristics exhibited when a cell is produced in the main surface current collecting structure. In other words, the load characteristics are load characteristics when it is assumed that the secondary battery (in particular, the electrode) has a main surface current collecting structure. The load characteristics are better when the conduction aid is not contained as long as the main surface current collecting structure is adopted. This is because the contact area between the active material and the solid electrolyte is large. On the other hand, when a cell containing the conduction aid in the positive electrode active material layer is produced in the same main surface current collecting structure, the load characteristics decrease. This is considered to be because the presence of the conduction aid at an interface between the active material and the solid electrolyte hinders ion transport.

Specifically, a ratio Rx of the capacity $C_{0.05}$ when charged at a current of 0.05 C with respect to the rated capacity and discharged at 0.05 C to the capacity $C_{0.2}$ when discharged at 0.2 C was calculated.

$$Rx(\%)=(C_{0.2}/C_{0.05})\times 100$$

For the ratio Rx in each Example/Comparative Example, the relative capacity ratio R2 to the ratio Rc1 in Comparative Example 1 in which the positive electrode layer did not contain a conductive material was calculated. The larger the ratio, the better the load characteristics.

$$R2(\%)=\{(Rx-Rc1)/Rc1\}\times 100$$

R2(%) was evaluated according to the following criteria:

●●: −1%≤R2 (premium);

●: −13%≤R2<−1% (best);

○: −18%≤R2<−13% (good);

Δ: −40%≤R2<−18% (acceptable (no problem in practical use));

X: R2<−40 (there is a problem in practical use).

(Evaluation 3: Theoretical Capacity Ratio)

It is a ratio of a discharge capacity that can be taken out when a cell is produced in an end surface current collecting structure to a theoretical capacity calculated from the positive electrode active material content. The produced battery was CCCV (constant current and constant voltage) charged at a current of 0.05 C with respect to the rated capacity at 4.35 V until reaching 0.01 C, and after a quiescent time of 10 minutes was provided, CC (constant current) discharge was performed at 0.05 C until reaching 3 V, and the discharge capacity C was evaluated. When the discharge capacity in each Example/Comparative Example was defined as Cx, the relative capacity ratio R3 to the theoretical capacity (CL) calculated from the active material content was calculated. The larger the ratio, the better the capacity characteristics.

$$R3(\%)=(Cx/CL)\times 100$$

The ratio of the discharge capacity was evaluated according to the following criteria:

⊙⊙: 98%≤ratio (premium);

⊙: 90%≤ratio<98% (best);

○: 80%≤ratio<90% (good);

Δ: 60%≤ratio<80% (acceptable (no problem in practical use));

X: Ratio<60% (there is a problem in practical use).

(Overall Evaluation)

Among the evaluation results of the evaluations 1 to 3 described above, the lowest evaluation result was shown as the overall evaluation.

⊙⊙: The lowest evaluation result was ⊙⊙ (excellent);

⊙: The lowest evaluation result was ⊙ (best);

○: The lowest evaluation result was ○ (good);

Δ: The lowest evaluation result was Δ (acceptable (no problem in practical use));

X: The lowest evaluation result was X (there is a problem in practical use).

Examples 2 to 22 and Comparative Example 1

A solid-state battery was manufactured and evaluated by the same method as in Example 1 except that the type and content of the conductive material were changed as shown in Table 1.

TABLE 1

| | Shape of conductive material | Kinds of conductive material | Columnar conductive material content x1(%) | Granular conductive material content x2(%) | Sheet-shaped conductive material content x3(%) | Sheet-Hollow conductive material content x4(%) | Capacity characteristics[1] (ratio to Ctrl) | Load characteristics[2] (ratio to Ctrl) | Theoretical capacity[3] ratio | Overall evaluation |
|---|---|---|---|---|---|---|---|---|---|---|
| Comparative Example 1 | None | None | — | — | — | — | 0.0% ⊙⊙ | 0.0% ⊙⊙ | 50% X | X |
| Example 1 | Columnar | Carbon nanotube A | 5% | — | — | — | −1.7% ⊙⊙ | −8.8% ⊙ | 98% ⊙⊙ | ⊙ |

TABLE 1-continued

| | Shape of conductive material | Kinds of conductive material | Columnar conductive material content x1(%) | Granular conductive material content x2(%) | Sheet-shaped conductive material content x3(%) | Sheet-Hollow conductive material content x4(%) | Capacity charac-teristics[1] (ratio to Ctrl) | Load charac-teristics[2] (ratio to Ctrl) | Theoretical capacity[3] ratio | Overall evaluation |
|---|---|---|---|---|---|---|---|---|---|---|
| Example 2 | Columnar | Carbon nanotube B | 5% | — | — | — | −2.2% ⊙ | −6.9% ⊙ | 98% ⊙⊙ | ⊙ |
| Example 3 | Columnar | Carbon nanotube C | 1% | — | — | — | 0.3% ⊙⊙ | 0.0% ⊙⊙ | 99% ⊙⊙ | ⊙⊙ |
| Example 4 | Columnar | Carbon nanotube C | 3% | — | — | — | −2.0% ⊙⊙ | −1.0% ⊙⊙ | 98% ⊙⊙ | ⊙⊙ |
| Example 5 | Columnar | Carbon nanotube C | 5% | — | — | — | −3.6% ⊙ | −2.0% ⊙ | 96% ⊙ | ⊙ |
| Example 6 | Columnar | Carbon nanotube C | 8% | — | — | — | −0.9% ⊙⊙ | −7.2% ⊙ | 99% ⊙⊙ | ⊙ |
| Example 7 | Columnar | Carbon nanotube C | 15% | — | — | — | −13.0% Δ | −34.0% Δ | 87% ○ | Δ |
| Example 8 | Granular | Acetylene black | — | 1% | — | — | 1.3% ⊙⊙ | −0.1% ⊙⊙ | 73% Δ | Δ |
| Example 9 | Granular | Acetylene black | — | 2% | — | — | 1.1% ⊙⊙ | −0.9% ⊙⊙ | 86% ○ | ○ |
| Example 10 | Granular | Acetylene black | — | 3% | — | — | −1.7% ⊙⊙ | −6.9% ⊙ | 98% ⊙⊙ | ⊙ |
| Example 11 | Granular | Acetylene black | — | 5% | — | — | −3.2% ⊙ | −10.5% ⊙ | 96% ⊙ | ⊙ |
| Example 12 | Granular | Acetylene black | — | 6% | — | — | 0% ⊙⊙ | −14.2% ○ | 98% ⊙⊙ | ○ |
| Example 13 | Granular | Acetylene black | — | 10% | — | — | 0% ⊙ | −18.1% Δ | 95% ⊙ | Δ |
| Example 14 | Granular | Acetylene black | — | 20% | — | — | −16.6% Δ | −40.0% Δ | 83% ○ | Δ |
| Example 15 | Hollow | Ketjen black | — | — | — | 5% | −4.8% ⊙ | −19.0% Δ | 95% ⊙ | Δ |
| Example 16 | Sheet-shape | Graphene | — | — | 1% | — | −0.1% ⊙⊙ | −0.5% ⊙⊙ | 65% Δ | Δ |
| Example 17 | Sheet-shape | Graphene | — | — | 3% | — | −1.2% ⊙⊙ | −4.6% ⊙ | 73% Δ | Δ |
| Example 18 | Sheet-shape | Graphene | — | — | 5% | — | −4.7% ⊙ | −18.3% Δ | 95% ⊙ | Δ |
| Example 19 | Sheet-shape | Graphene | — | — | 8% | — | −5.2% ⊙ | −20.6% Δ | 95% ⊙ | Δ |
| Example 20 | Columnar + granular | Carbon nanotube C + acetylene black | 5% | 3% | — | — | −3.3% ⊙ | −12.1% ⊙ | 97% ⊙ | ⊙ |
| Example 21 | Columnar + hollow | Carbon nanotube C + Ketjen black | 5% | — | — | 3% | −7.4% ⊙ | −11.4% ⊙ | 93% ⊙ | ⊙ |
| Example 22 | Hollow + sheet-shape | Ketjen black + Graphene | — | — | 5% | 3% | −11.4% Δ | −18.9% Δ | 88% ○ | Δ |

"—" means not being contained.
x = x1 + x2 + x3 + x4

Notations 1 to 3 in Table 1 are as follows:

1: A relative capacity ratio with respect to a discharge capacity Cc1 in Comparative Example 1 in which the positive electrode layer does not contain a conductive material, which is a capacity shown when a main surface current collecting structure is adopted.

2: A relative capacity ratio when the 0.2 C capacity in Comparative Example 1 in which the positive electrode layer does not contain a conductive material is set to 100, which is a characteristic shown when a main surface current collecting structure is adopted.

3: A ratio of a discharge capacity that can be taken out when an end surface current collecting structure is adopted to a theoretical capacity calculated from the positive electrode active material content.

The solid-state battery of the present invention can be used in various fields where electric storage is assumed. Although it is merely an example, the solid-state battery of the present invention can be used in the fields of electricity, information, and communication in which mobile equipment, and the like are used (for example, electric and electronic equipment fields or mobile equipment fields including mobile phones, smartphones, notebook computers and digital cameras, activity meters, arm computers, electronic papers, and small electronic machines such as RFID tags, card type electronic money, and smartwatches), home and small industrial applications (for example, the fields of electric tools, golf carts, and home, nursing, and industrial robots), large industrial applications (for example, fields of forklift, elevator, and harbor crane), transportation system fields (field of, for example, hybrid automobiles, electric automobiles, buses, trains, power-assisted bicycles, and electric two-wheeled vehicles), power system applications (for example, fields such as various types of power generation, road conditioners, smart grids, and household power storage systems), medical applications (medical equipment fields such as earphone hearing aids), pharmaceutical applications (fields such as dosage management systems), IoT fields, space and deep sea applications (for example, fields such as a space probe and a submersible), and the like.

DESCRIPTION OF REFERENCE SYMBOLS

10: Electrode layer
10A: Positive electrode layer
10B: Negative electrode layer
11: Positive electrode current collecting portion
20: Solid-state electrolyte layer
30: Electrode separation portion
30A: Positive electrode separation portion
30B: Negative electrode separation portion
40: Terminal
40A: Positive electrode terminal
40B: Negative electrode terminal
60: Outer layer material
100: Solid-state battery laminate
200: Solid-state battery

The invention claimed is:

1. A solid-state battery comprising:

a solid-state battery laminate including at least one battery constituent unit including:

a positive electrode layer, the positive electrode layer containing a conductive carbon material;

a positive electrode current collecting portion arranged at an end surface of the positive electrode layer;

a negative electrode layer; and a solid-state electrolyte layer interposed between the positive electrode layer and the negative electrode layer in a stacking direction thereof;

a positive electrode terminal electrically connected to the positive electrode current collecting portion; and a negative electrode terminal directly and electrically connected to the negative electrode layer, wherein the solid electrolyte layer is in direct contact with both the positive electrode terminal and the negative electrode terminal, wherein a main surface area of the positive electrode layer is smaller than that of the negative electrode layer in a plan view of the solid-state battery laminate, in the plan view, a distance from the positive electrode terminal to a boundary between the positive electrode layer and the positive electrode current collecting portion is greater than a distance from the positive electrode terminal to the negative electrode layer that is adjacent to the positive electrode layer in the stacking direction, and wherein the boundary between the positive electrode layer and the positive electrode current collecting portion extends in the stacking direction.

2. The solid-state battery according to claim 1, wherein the positive electrode layer and the positive electrode current collecting portion are in contact with each other at the end surface of the positive electrode layer, and adjacent to each other in a direction perpendicular to the stacking direction in a sectional view of the solid-state battery laminate.

3. The solid-state battery according to claim 2, wherein the positive electrode current collecting portion has an upper surface which is flush with an upper surface of the positive electrode layer in the stacking direction, and a lower surface which is flush with a lower surface of the positive electrode layer in the stacking direction.

4. The solid-state battery according to claim 1, wherein the positive electrode current collecting portion has an upper surface which is flush with an upper surface of the positive electrode layer in the stacking direction, and a lower surface which is flush with a lower surface of the positive electrode layer in the stacking direction.

5. The solid-state battery according to claim 1, wherein the conductive carbon material is one or more carbon materials selected from the group consisting of a columnar carbon material, a granular carbon material, a hollow carbon material, and a sheet-shaped carbon material.

6. The solid-state battery according to claim 1, wherein a content of the conductive carbon material is 0.5 mass % to 25 mass % with respect to a total amount of the positive electrode layer.

7. The solid-state battery according to claim 1, wherein the conductive carbon material contains one or more carbon materials selected from the group consisting of a columnar carbon material and a granular carbon material, and at least one of:

A1: a content of the columnar carbon material is 0.5 mass % to 12 mass % with respect to a total amount of the positive electrode layer; and A2: a content of the granular carbon material is 1.5 mass % to 8 mass % with respect to the total amount of the positive electrode layer.

8. The solid-state battery according to claim 1, wherein the conductive carbon material contains one or more carbon materials selected from the group consisting of a columnar carbon material and a granular carbon material, and at least one of:

B1: a content of the columnar carbon material is 0.5 mass % to 12 mass % with respect to a total amount of the positive electrode layer; and B2: a content of the granular carbon material is 2.5 mass % to 5.5 mass % with respect to the total amount of the positive electrode layer.

9. The solid-state battery according to claim 1, wherein the conductive carbon material comprises a columnar carbon material, and a content of the columnar carbon material is 0.5 mass % to 4 mass % with respect to a total amount of the positive electrode layer.

10. The solid-state battery according to claim 1, wherein the positive electrode layer and the negative electrode layer are layers capable of occluding and releasing a lithium ion.

11. The solid-state battery according to claim 1, wherein the positive electrode current collecting portion has a same width direction dimension as that of the positive electrode layer in a plan view in an extending direction of the positive electrode layer.

12. The solid-state battery according to claim 1, wherein the positive electrode current collecting portion has a larger width direction dimension than that of the positive electrode layer in a plan view in an extending direction of the positive electrode layer.

13. The solid-state battery according to claim 1, wherein a width of the positive electrode current collecting portion increases in a direction from the positive electrode layer toward the positive electrode terminal.

14. The solid-state battery according to claim 1, wherein the positive electrode current collecting portion is in contact with at least two sides of the positive electrode layer in a plan view of the solid-state battery laminate.

15. The solid-state battery according to claim 1, wherein a boundary between the positive electrode current collecting portion and the positive electrode layer has a sectional view shape in a straight line parallel to the stacking direction in a sectional view of the solid-state battery laminate.

16. The solid-state battery according to claim 1, wherein a boundary between the positive electrode current collecting portion and the positive electrode layer has a linearly inclined sectional view shape from an upper surface toward a lower surface of the positive electrode layer in a sectional view of the solid-state battery laminate.

17. The solid-state battery according to claim 1, wherein a boundary between the positive electrode current collecting portion and the positive electrode layer has a curved sectional view shape from an upper surface toward a lower surface of the positive electrode layer in a sectional view of the solid-state battery laminate.

18. The solid-state battery according to claim 1, wherein a boundary between the positive electrode current collecting portion and the positive electrode layer has an angular protrusion sectional view shape from an upper surface toward a lower surface of the positive electrode layer in a sectional view of the solid-state battery laminate.

* * * * *